(12) United States Patent
Kumar et al.

(10) Patent No.: US 11,616,433 B2
(45) Date of Patent: Mar. 28, 2023

(54) ACTIVE NOISE FILTERING FOR SWITCH MODE POWER SUPPLIES

(71) Applicant: TEXAS INSTRUMENTS INCORPORATED, Dallas, TX (US)

(72) Inventors: Ashish Kumar, Santa Clara, CA (US); Yogesh Kumar Ramadass, San Jose, CA (US); Manish Bhardwaj, Poughkeepsie, NY (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/223,786

(22) Filed: Apr. 6, 2021

(65) Prior Publication Data

US 2021/0313876 A1 Oct. 7, 2021

Related U.S. Application Data

(60) Provisional application No. 63/107,171, filed on Oct. 29, 2020, provisional application No. 63/006,429, filed on Apr. 7, 2020.

(51) Int. Cl.
*H02M 1/44* (2007.01)
*H02M 1/00* (2006.01)
*H02M 3/335* (2006.01)
*H02M 1/12* (2006.01)

(52) U.S. Cl.
CPC ........... *H02M 1/44* (2013.01); *H02M 1/0058* (2021.05); *H02M 1/123* (2021.05); *H02M 3/33561* (2013.01)

(58) Field of Classification Search
CPC ...... H02M 1/44; H02M 1/0058; H02M 1/123; H02M 3/33561
See application file for complete search history.

(56) References Cited

U.S. PATENT DOCUMENTS

| | | | |
|---|---|---|---|
| 2018/0226875 A1* | 8/2018 | Curtis | ................... H02M 1/36 |
| 2018/0295758 A1 | 10/2018 | Chu et al. | |
| 2020/0313549 A1 | 10/2020 | Chu et al. | |

OTHER PUBLICATIONS

Texas Instruments; Design Guide: TIDM-2008/TIDM-1007, Bidirectional Interleaved CCM Totem Pole Bridgeless PFC Reference Design Using C2000 MCU; TIDUD61D—Oct. 2020; 78 pgs.

(Continued)

*Primary Examiner* — Adolf D Berhane
(74) *Attorney, Agent, or Firm* — Frank D. Cimino

(57) ABSTRACT

In a described example, a circuit includes a sensor, a controller and an amplifier. The sensor has a sensor input and a sensor output. The sensor input is adapted to be coupled to a chassis of a switch-mode power supply (SMPS). The controller has an input, a timing output and a level output. The input of the control circuit is coupled to the sensor output. The amplifier has a timing control input, a level control input and an amplifier output. The level control input is coupled to the level output of the controller. The timing control input is coupled to the timing output, and the amplifier output is coupled to the sensor input. The amplifier is configured to provide compensation pulses at the amplifier output having magnitude and timing to reduce common-mode noise on the chassis.

22 Claims, 12 Drawing Sheets

(56) References Cited

OTHER PUBLICATIONS

Texas Instruments; TI Designs: TIDA-01604 98.6% Efficiency, 6.6-kW Totem-Pole PFC Reference Design for HEV/EV Onboard Charger; Apr. 2020; 71 pgs.
Texas Instruments; Design Guide: TIDA-00961, High-Efficiency, 1.6-kW High-Density GaN-Based 1-MHz CrM Totem-Pole PFC Converter Reference Design—Jun. 2019; 24 pgs.

* cited by examiner

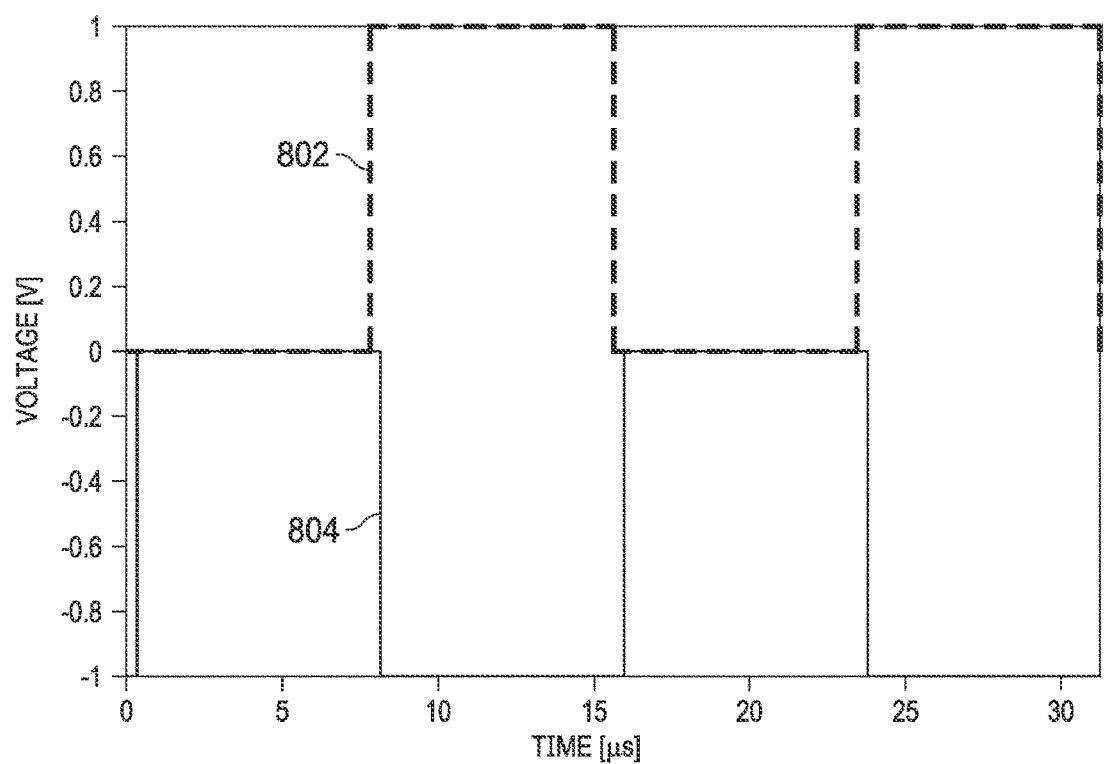
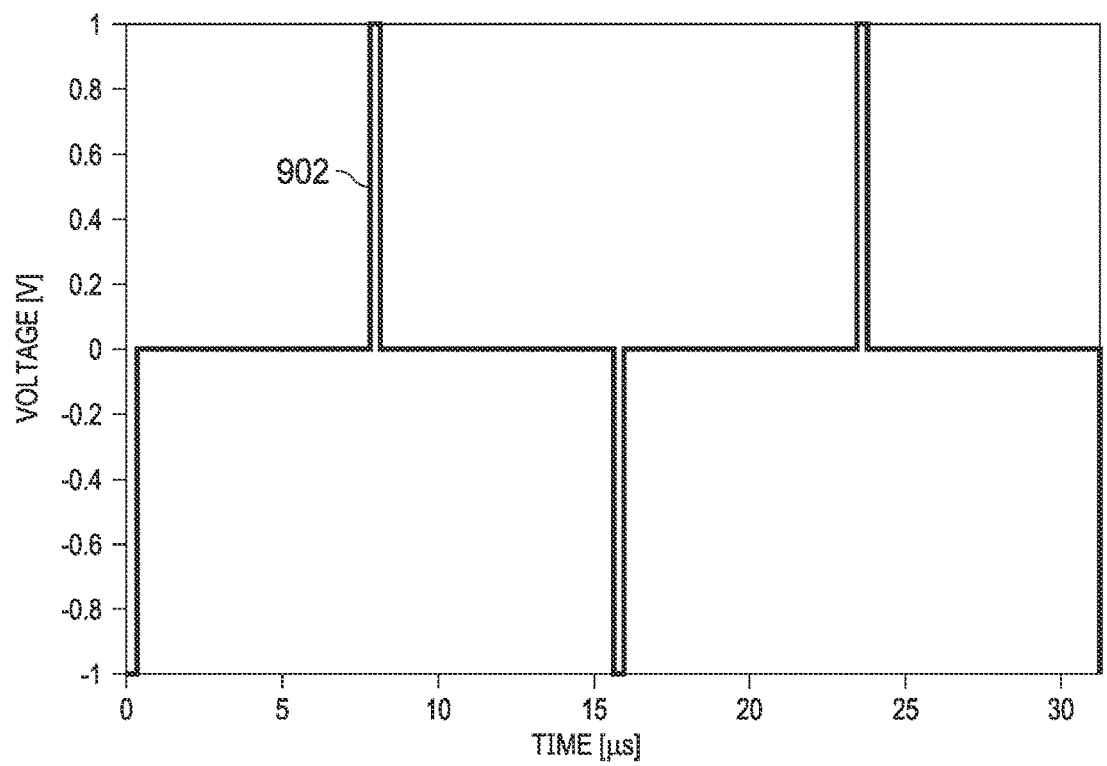

ACTIVE NOISE FILTERING FOR SWITCH MODE POWER SUPPLIES

CROSS-REFERENCE TO RELATED APPLICATION

This application claims priority to U.S. provisional patent application No. 63/006,429, filed Apr. 7, 2020, and U.S. provisional patent application No. 63/107,171, filed Oct. 29, 2020, each of which is hereby incorporated by reference in its entirety.

TECHNICAL FIELD

This description relates active noise filtering for switch mode power supplies.

BACKGROUND

A switch-mode power supply (SMPS) transfers power from an input power source to a load by switching one or more power transistors. The power transistors are coupled through a switch node to an energy storage element (e.g., a capacitor) that is capable of coupling to the load. An SMPS can include an SMPS controller to provide one or more switching (e.g., PWM) control signals to drive the power transistor(s). The switching on and off of the power transistors creates a pulsating voltage at the switch node. The switch node can be coupled to a chassis ground through parasitic capacitance, such that the pulsating voltage can inject noise into the chassis ground, which presents as common-mode electromagnetic interference (EMI). Common-mode EMI is typically reduced by passive filtering using chokes, which tend to adversely affect the cost, size and efficiency of the SMPS.

SUMMARY

In a described example, a circuit includes a sensor, a controller and an amplifier. The sensor has a sensor input and a sensor output. The sensor input is adapted to be coupled to a chassis of a switch-mode power supply (SMPS). The controller has an input, a timing output and a level output. The input of the control circuit is coupled to the sensor output. The amplifier has a timing control input, a level control input and an amplifier output. The level control input is coupled to the level output of the controller. The timing control input is coupled to the timing output, and the amplifier output is coupled to the sensor input. The amplifier is configured to provide compensation pulses at the amplifier output having magnitude and timing to reduce common-mode noise on the chassis.

In another described example, a circuit includes a sensor, a controller and an amplifier. The sensor is configured to provide a sensor signal at a sensor output representative of a chassis voltage at a chassis of a switch-mode power supply (SMPS). The controller is configured to provide a level control signal responsive to the sensor signal and responsive to a timing signal responsive to switching of power switches of the SMPS. The amplifier has an output adapted to be coupled to the chassis of the SMPS. The amplifier is configured to provide a compensation pulse at the output, the compensation pulse having a magnitude responsive to the level control signal and timing responsive to the timing signal.

In another described example, a system includes a passive filter circuit having line and neutral inputs adapted to be coupled to an AC input voltage source. The passive filter is configured to provide a filtered AC input voltage at line and neutral outputs. A switch-mode power supply (SMPS) has line and neutral inputs, a power output and a power ground. The line and neutral inputs are coupled to respective line and neutral outputs of the passive filter. A parasitic capacitance is coupled between the line input of the SMPS and a chassis ground. An active filter includes a sensor, a controller and an amplifier. The sensor has a sensor input and a sensor output. The sensor input is coupled to the chassis ground. The controller has an input, a timing control output and a level control output. The input of the controller is coupled to the sensor output. The amplifier has a timing control input, a level control input and a compensation output. The level control input is coupled to the level control output of the controller. The timing control input is coupled to the timing output, and the compensation output is coupled to the chassis ground. The amplifier is configured to provide compensation pulses at the compensation output having magnitude and timing to reduce noise on the chassis ground.

BRIEF DESCRIPTION OF THE DRAWINGS

FIG. 8 is a signal diagram showing example waveforms of chassis voltage and the injection of compensation pulses.

FIG. 9 is a signal diagram showing chassis voltage after injection of compensation pulses.

DETAILED DESCRIPTION

Figure 1:
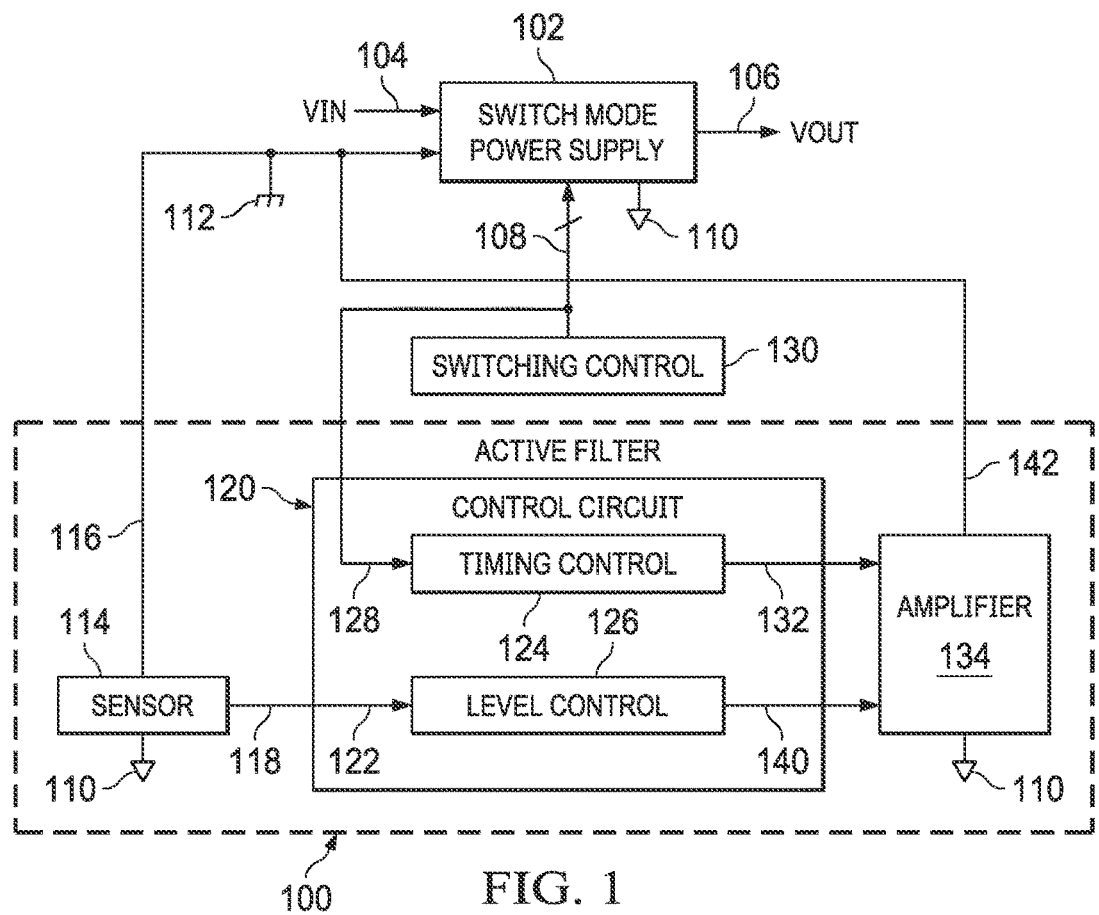
FIG. 1 is a block diagram depicting an example of an active EMI filter.

This description relates to active filtering to reduce noise, including common-mode electromagnetic interference (EMI), in switching circuits, such as switch-mode power supplies (SMPSs). For example, the SMPS is configured to transfer power from a DC or AC power source to a load output by switching one or more power transistors coupled between the power source and the load. The switching of the power transistors can introduce noise to a chassis ground (also referred to as a chassis) through a parasitic capacitance. The term "chassis ground" or "chassis," as used in the context of an SMPS, refers to a physical structure (e.g., a conductive enclosure or a conductive portion of the enclosure) in which the SMPS resides. The introduction of noise due to switching can cause jumps in chassis voltage, including positive and/or negative voltage jumps. The term "chassis voltage" refers to a voltage of the chassis (or chassis ground) measured with respect to another ground (e.g., a power ground) of the SMPS. For example, the power ground of the SMPS provides a reference voltage (e.g., 0 V) for the SMPS. Also, as used herein, a voltage jump refers to an increase or decrease in voltage level that occurs over a much shorter duration than the switching period of the SMPS. For example, in an SMPS having a switching period of 100 µs, a voltage jump may occur for duration that is less than 100 ns.

As described herein, an active filter is configured to inject compensation pulses (e.g., current) to the chassis ground to reduce respective jumps in chassis voltage generated responsive to switching of an SMPS to which the active filter is coupled. For example, the active filter includes a sensor coupled to the chassis ground. The sensor is configured to sense the chassis voltage of the SMPS and provide a sensor signal representative of the chassis voltage at a sensor output. A controller is coupled to the sensor output and configured to receive the sensor signal. The controller is configured to determine magnitude and timing of the compensation pulses to reduce the fluctuations (e.g., jumps) in the chassis voltage due to switching transitions of power transistors in the SMPS. For example, the controller is configured to provide one or more timing control signals to control timing of the compensation pulses responsive to switching of respective power transistors of the SMPS. For example, the controller is configured to implement a delay in the timing control signals. In an example, the delay implemented by the controller is programmable. The controller is also configured to provide a level control signal to control the magnitude of the compensation pulses responsive to the sensor signal, which is representative of the chassis voltage.

As a further example, the chassis voltage may exhibit large swings and/or ringing at or near respective switching transitions. Such swings in the chassis voltage may also occur responsive to zero crossings of the line voltage in AC-DC power converters. Thus, in an example, the sensor is configured to reset the sensor output (e.g., set the sensor signal to zero volts) responsive to line-frequency zero crossings. In an additional or alternative example, the sensor is configured to reset the sensor output (e.g., set the sensor signal to zero volts) responsive to high-frequency switch transitions of respective power transistors of the SMPS. The controller has one or more outputs that is coupled to respective inputs of an amplifier. For example, the amplifier is implemented as a push/pull amplifier. The amplifier has an output coupled to the chassis ground. The amplifier is configured to generate respective compensation pulses at an output of the amplifier responsive to the timing control signal(s) and the level control signal.

In an example, the controller can be implemented as a microcontroller (e.g., a microcontroller integrated circuit) configured to determine the magnitude and timing of the compensation pulses, such as described herein. The microcontroller can also be configured to provide switching control signals to control respective power transistors of the SMPS.

In examples of certain types of AC-DC power converters (e.g., totem pole, power factor correction (PFC) converters), the controller is configured to control injection of the compensation pulses responsive to different types of switching transitions of the power converter. For example, the controller is configured to control timing of compensation of pulses depending upon whether the switch-mode power supply is exhibiting hard or soft switching transitions. Additionally, or alternatively, the controller can control magnitude of compensation of pulses depending upon whether the switch-mode power supply is exhibiting hard or soft switching transitions. For example, the controller is configured to determine a current injection level (magnitude) for both hard and soft switching transitions responsive to the sensed chassis voltage for a soft switching transition. Also, the controller can implement different injection delays for hard and soft switching transitions. For example, the controller is configured to determine an injection delay for respective hard and soft switching transitions sufficient to accommodate ringing noise for a hard switching transition.

The active EMI filter described herein can achieve comparable or better reduction in common-mode noise relative to many existing power converter designs, while also reducing the size of passive filters and common-mode chokes. The reduction in size for such filters and chokes further translates to a reduced overall cost of the power converter system. Also, by implementing the active EMI filter in a closed loop circuit, such as described herein, the same active EMI filter design may be used in combination with a variety of different switch-mode power supply designs. In the example embodiment where the controller of the active EMI filter is implemented in a microcontroller, the active EMI filter can be implemented with little additional overhead to the power supply system. For example, minimal additional circuitry would be added to implement the sensor and amplifier of the active EMI filter.

FIG. 1 depicts an example of an active filter 100 that is configured to reduce common-mode EMI of an SMPS 102. The SMPS 102 is coupled between a power input 104 and a power output 106. The SMPS 102 is configured to convert an input voltage VIN into a corresponding output voltage VOUT. As a further example, the SMPS 102 includes respective switches coupled between the input 104, which is configured to receive an AC input voltage VIN, and the output 106 of the converter (e.g., power transistors arranged in a totem-pole power factor correction configuration). The SMPS 102 is configured to control respective switches (e.g., power transistors) responsive to switching signals received at 108 (e.g., from switching control 130) to convert the input voltage VIN to the output voltage VOUT. While many examples of the SMPS 102 are described herein in reference to an AC-DC power converter, the active filter 100 is equally applicable to reduce EMI in other types switching circuits, including different types of power converters, such as buck, boost, and buck-boost converters to name a few.

The SMPS 102 includes a power ground 110 and a chassis ground 112. For example, the chassis ground 112 is coupled to the input 104 of the SMPS 102 through parasitic capacitance. Switching of the respective power transistors of the SMPS 102 responsive to the switching control signals can include hard and soft switching transitions. As used herein, hard switching transition refers to a switching transition in which a power transistor of the SMPS 102 is turned ON while a substantial voltage still exists across the transistor. In contrast, in a soft switching transition, the voltage across the power transistor is reduced to zero by a current in the SMPS circuit before the power transistor is switched ON. Hard switching transitions also occur over substantially smaller time durations than soft switching transitions (e.g., a duration of less than 10 ns for hard switching transitions compared to more than 50 ns for soft switching transitions). During both hard and soft switching transitions of respective transistors of the SMPS 102, noise is injected into the chassis ground 112 as pulses of current propagating from the SMPS 102 through respective parasitic capacitances to chassis ground. The injected noise causes jumps in the chassis voltage at 112, which is presented as common-mode EMI on the chassis.

The active filter 100 includes a sensor 114. The sensor 114 includes a sensor input 116 and a sensor output 118. The sensor input is coupled to the chassis ground 112. The sensor is configured to provide a sensor signal at the output 118 representative of the sensed chassis voltage at 112. For example, the sensor 114 is configured to filter the sensor signal (e.g., performing high-pass and/or low-pass filtering) to provide a clean version of the chassis voltage.

A control circuit (also referred to herein as a controller) 120 has an input 122 coupled to the sensor output 118. The control circuit 120 thus receives the sensor signal at its input 122 representative of the chassis voltage. The control circuit 120 includes timing control 124 and a level control 126. The timing control has an input 128 and an output 132. The timing control input 128 can be coupled to 108 to receive the switching signals. For example, the switching signals received by the timing control circuit 124 include one or more switching control signals, gate drive signals or other switching signals representative of switching transitions (e.g., rising and/or falling edges) of power switches of the SMPS 108. In one example, the switching signals at 108 include one or more switching control signals (e.g., pulse-width modulated (PWM) signals) generated by switching control 130. As shown in the example of FIG. 1, the switching control 130 may be implemented external to the control circuit 120, such as by an arrangement of discrete circuitry configured to generate switching control signals. In another example (see, e.g., FIGS. 3A and 3B), the switching control 130 may be implemented as part of the control circuit 120. The timing control output 132 is coupled to an input of an amplifier 134.

The timing control circuit 124 is configured to provide a timing signal pulse responsive to one or more of the switching signals at 108. The timing control circuit 124 can be configured to provide the timing signal pulse to have a timing relative to a respective edge of the switching control signal. In an example, the timing control circuit 124 is configured to provide first and second timing signal pulses responsive to respective rising and falling edges of a high-frequency switching control signal, which is provided to a control input of a respective power transistor of the SMPS 102. As used herein, in the context of switching control signals, high-frequency refers to a switching frequency greater than 1 kHz, such as 10 kHz to 100 kHz or greater.

The level control circuit 126 includes the input 122 (coupled to the sensor output 118), and has an output 140 coupled to another input of the amplifier 134. The level control circuit 126 is configured to generate a level signal at the output 140 representative of a magnitude of a compensation signal pulse that is to be provided to the chassis ground 112. Thus, the amplifier 134 receives the timing signal at the input coupled to the timing control output 132 and a level signal at the input coupled to the level control output 140. The amplifier 134 has an output 142 that is coupled to the chassis ground 112. The amplifier 134 is configured to provide a compensation pulse at the output 142 responsive to the timing signal and the level signal. For example, the amplifier is configured to provide compensation pulse with a magnitude responsive to the level signal and a timing (e.g., a start time) responsive to the timing signal. In an example, the amplifier 134 is implemented at a push/pull circuit to provide the compensation pulses to cancel the chassis voltage that was introduced through the parasitic capacitance(s) of the SMPS 102. In an example where the timing control circuit 124 is configured to provide timing signals representative of both rising and falling switching transitions, the amplifier 134 is further configured to provide respective compensation pulses to cancel respective positive and negative jumps in the chassis voltage that occur responsive to such switching transitions.

Figure 2:
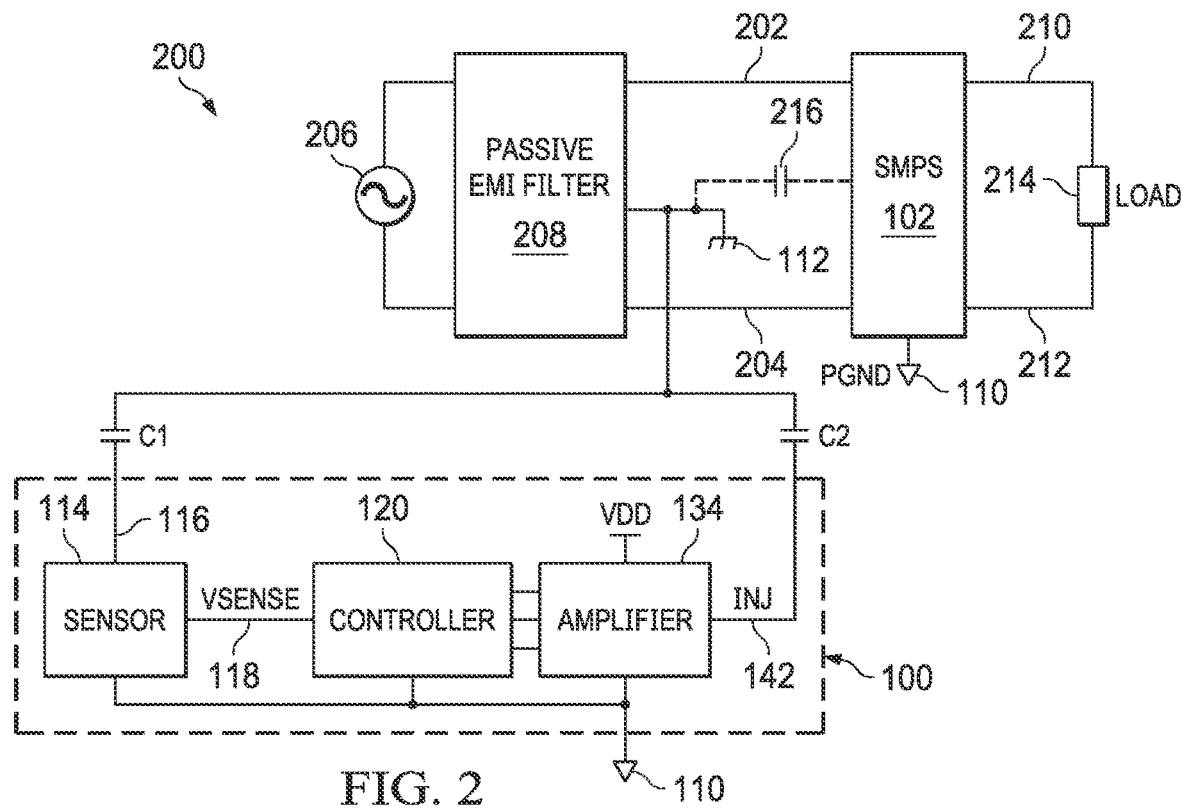
FIG. 2 is a block diagram of an example power converter that includes an active EMI filter.

FIG. 2 depicts an example of a power converter (e.g., SMPS) system 200 that includes the active filter 100 of FIG. 1. Thus, the following description of FIG. 2 also refers to FIG. 1. In the example of FIG. 2, the power converter system 200 includes an SMPS 102 having inputs 202 and 204 coupled an AC power source 206. For example, the SMPS is configured as an AC-DC totem-pole PFC converter. The AC power source 206 is configured to provide an input AC voltage (e.g., a line-to-neutral voltage) to the inputs 202 and 204. For example, the input 202 is a line input and the input 204 is a neutral input. The SMPS 102 has outputs 210 and 212 adapted to be coupled to a load demonstrated at 214.

The power converter system 200 also includes a passive EMI filter 208 coupled between the power source 206 and the inputs 202 and 204 of the converter 102. For example, the passive EMI filter 208 may include an arrangement of inductors and capacitors configured to provide a common-mode choke and transformer windings (e.g., cross coupled inductors).

The power converter system 200 also includes a power ground (e.g., a reference voltage, such as 0 V) 110 and a chassis ground 112, which can be coupled to earth ground. As described, the chassis ground (or simply chassis) refers to a physical structure (e.g., a conductive enclosure or a conductive portion of an enclosure) in which the system 200 is implemented. The converter 102 includes one or more parasitic capacitances, shown at 216, which can be coupled between one or both of the converter inputs 202, 204 and the chassis ground 112. In the example of FIG. 2, the passive EMI filter 208 is also coupled to the chassis ground 112. For example, the parasitic capacitance 216 is coupled between a switching node of the converter 102 (e.g., between power transistors) and the chassis 112.

For example, the sensor 114 includes a capacitor C1 (e.g., a Y-capacitor) coupled to the sensor input 116, which is coupled to a chassis 112. Similarly, another capacitor (e.g., a Y-capacitor) C2 is coupled between amplifier output 142 and the chassis ground 112. Capacitors C1 and C2 help isolate the active filter 100 from the chassis 112 by blocking the line-frequency components of the chassis voltage. In the example of FIG. 2, the amplifier 134 is coupled between power ground 110 and a power supply terminal, which supplies a DC voltage VDD. Thus, in an example where the amplifier 134 is configured as a push-pull circuit, the amplifier output signal (e.g., a compensation current pulse INJ) at output 142 can vary the output by sourcing current from VDD or sinking current to the power ground at 110. The power supply voltage VDD can be an existing supply of the system already configured to supply power to other circuitry or VDD can be derived from another supply using a regulator, such as a DC-DC converter or a low-drop out regulator (LDO).

For example, the converter 102 includes respective transistors coupled to respective inputs 202 and 204 and respective outputs 210 and 212. During switching transitions of the respective transitions of the converter, noise is injected to the chassis 112 through the parasitic capacitances 216. This results in sharp increases and decreases of the chassis voltage at 112 responsive to the noise that is introduced. As described herein, the active filter 100 is configured to actively inject compensation pulses current to the chassis ground 112 to reduce (or cancel) the jumps in the chassis voltage. For example, the sensor 114 is configured to sense the magnitude of the chassis voltage at 112 and provide the sensor signal (VSENSE) at 118 to the control circuit 120. The control circuit 120 is configured to control both timing and magnitude of the compensation pulses to be injected. The control circuit 120 is configured to derive the timing in a way to closely align the compensation pulses with the switching transitions of the power converter. For example, the control circuit 120 is configured to tune programmable delays of the control circuit 120 in an open loop or closed loop manner. As an example of open loop delay tuning, the alignment between the switching transitions and compensation pulses can be observed experimentally (e.g., on an oscilloscope or other test equipment) and used to program the delay of the control circuit 120 responsive to such observed alignment. As an example of closed loop delay tuning, the control circuit 120 is configured to sense the switching node voltage to detect switching transitions and to control timing of the compensation pulses responsive to the sensed switching node voltage. The control circuit 120 is configured to provide respective timing and level control signals to the amplifier 134. The amplifier 134 is configured to generate the compensation pulses at the amplifier output 142 responsive to the respective timing and level control signals, and the compensation pulses are supplied through capacitor C2 to the chassis ground 112. The resulting compensation pulses thus reduce the jumps in chassis voltage, thereby returning the chassis voltage to approximately its pre-noise level.

Figure 3A:
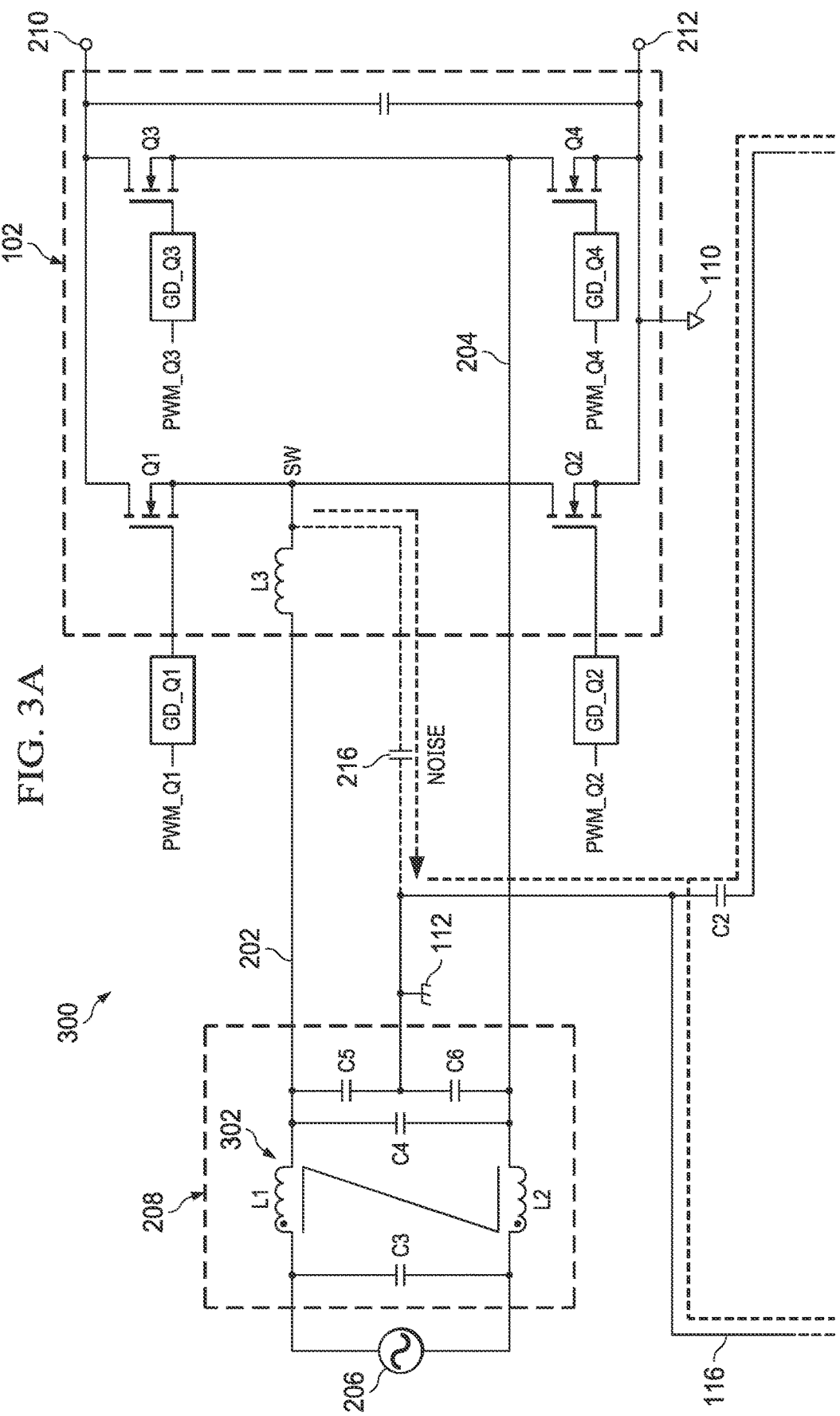
FIGS. 3A and 3B are a circuit diagram depicting an example power converter system that includes an active EMI filter.
Figure 3B:
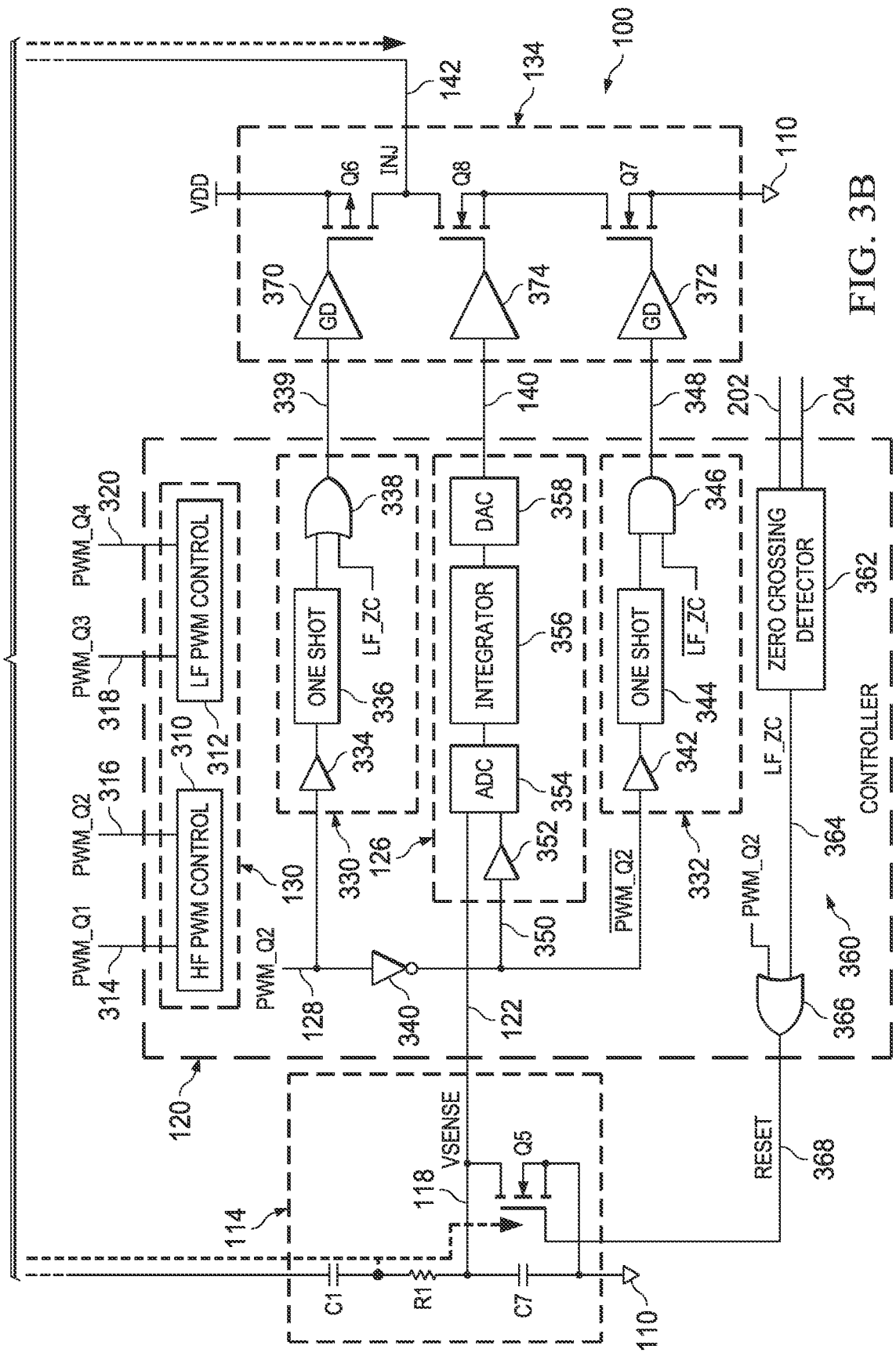

FIGS. 3A and 3B are a circuit diagram depicting an example of an SMPS (e.g., power AC-DC power converter) system 300 implementing the active filter 100 as described herein. The circuit diagram is representative of the power converter system 200 of FIG. 2 and the active filter 100 of FIG. 1. Accordingly, the following description for the system 300 also refers to the active EMI filter of FIG. 1 and the system 200 of FIG. 2.

In the example of FIG. 3A, the system 300 includes a passive filter 208 coupled between AC power source 206 and converter 102. For example, the passive filter 208 includes a capacitor C3 coupled between line and neutral inputs of the AC power source 206. A common-mode choke 302 includes inductors L1 and L2 that form respective windings of the choke 302. Another capacitor C4 is coupled between the line and neutral terminals. The choke 302 thus is coupled between capacitors C3 and C4. Capacitors C5 and C6 are coupled in parallel with the capacitor C4. A junction between respective plates of capacitors C5 and C6 is coupled to chassis ground 112. Capacitors C3 and C4 are configured to attenuate differential mode noise (e.g., signals and spikes) that appears between line and neutral terminals. The respective windings L1 and L2 of the choke are configured to provide high impedance for common-mode noise such as created due to rapid changes in voltage within the converter 102 and capacitors C5 and C6 divert such noise to the chassis ground 112.

Also, the converter 102 is configured to convert the AC input voltage across inputs 202 and 204 to a respective DC output voltage potential between outputs 210 and 212. In an example, the power converter may be a boost converter to convert the AC input voltage (e.g., 120 V AC or 240 V AC at a frequency of 50 Hz or 60 Hz) to a DC output voltage (e.g., about 400 V DC or greater). In the example of FIG. 3, the converter 102 includes an inductor L3 and an arrangement of transistors Q1, Q2, Q3 and Q4. For example, transistors Q1, Q2, Q3 and Q4 are configured as a totem-pole power factor correcting boost AC-DC converter. For example, respective transistors Q1, Q2, Q3 and Q4 are N-type metal oxide semiconductor field effect transistors (NFETs). Alternatively, Q1, Q2, Q3 and Q4 could be implemented as P-type metal oxide semiconductor field effect transistors (PFETs). In still other examples, other types of semiconductor switches could be used including bipolar junction transistors, such as insulated gate bipolar transistors (IGBT), laterally diffused metal oxide semiconductor (LDMOS) transistors, thyristors or the like.

As shown in the example of FIG. 3A, transistors Q1 and Q2 are coupled in series between outputs 210 and 212. Outputs 210 and 212 are adapted to be coupled to a load (e.g., load 214 of FIG. 2) to supply an output voltage. For example, the line input 202 is coupled to the drain of Q1 and the source of Q2, which are coupled together at a high-frequency switching node (SW) of the converter 102. Transistors Q3 and Q4 are also coupled in series between the output 210 and 212. The other input (e.g., the neutral input) 204 is coupled to the source of Q3 and the drain of Q4 at a low-frequency switch node of the converter 102. A gate driver GD_Q1 is coupled to the gate of Q1, and configured to drive the gate responsive to a switching control signal, shown at PWM_Q1. Similarly, a gate drive GD_Q2 is coupled to the gate of Q2. The gate drive GD_Q2 drives the gate of Q2 responsive to a switching control signal, shown at PWM_Q2. A gate driver GD_Q3 is coupled to the gate of Q3 and another gate driver GD_Q4 is coupled to the gate of Q4. Gate driver GD_Q3 drives the gate of Q3 responsive to switching control signal PWM_Q3. Gate driver GD_Q4 drives the gate of Q4 responsive to another switching signal shown at PWM_Q4.

In the example of FIG. 3A, transistors Q1 and Q2 are high-frequency transistors, and transistors Q3 and Q4 are low frequency transistors. Thus, the respective switching signals (e.g., PWM_Q1, PWM_Q2) are high speed switching signals, such as having a frequency greater than 1 KHz (e.g., 10 KHz to 100 KHz or greater). The switching signals PWM_Q3 and PWM_Q4 are low speed switching signals having the same frequency as the AC input voltage (e.g., 50 Hz or 60 Hz). As a result, the converter 102 is configured to convert the AC voltage received at inputs 202 and 204 to a corresponding DC voltage across respective outputs 210 and 212.

The sensor 114 includes an arrangement of passive circuit elements to sense the chassis voltage at 112. In the example of FIG. 3B, the sensor 114 includes an RC network coupled between sensor input 116 and power ground 110. The RC network of the sensor 114 is configured to filter high-frequency and low frequency signal components from the chassis voltage at 112 to result in the corresponding sensor output signal at 118. For example, the RC network includes capacitor C1 coupled in series with resistor R1 and capacitor C7, which is coupled to power ground. For frequencies at which the active filter is designed to sense noise on the chassis 112 (e.g., at the switching frequency of the power converter and its first few harmonics), capacitors C1 and C7 are configured as a capacitive divider to provide a corresponding sensor output signal at the sensor output 118, which is coupled to a juncture between resistor R1 and capacitor C7. For higher frequencies at which the active filter is not designed to respond (e.g., at tens of MHz where the chassis voltage may have ringing), the resistor R1 and capacitor C7 operate as a low-pass filter configured to block such high-frequency signal components.

In an example, a switch Q5 is coupled between the sensor output 118 and the power ground 110. For example, Q5 may be implemented as an NFET having a drain coupled to the output 118, a source coupled to a power ground 110, and a gate coupled to a reset output 368 of reset circuitry 360. For example, Q5 is turned on responsive to the reset signal provided at 368 to couple the sensor output 118 to the power ground 110. When the sensor output is coupled to the power ground 110, the sensor output is reset to the power ground reference voltage (e.g., 0 volts) of the converter 102. For example, the reset signal can be generated to activate the switch device Q5 at respective high-frequency switch transitions (e.g., responsive to PWM_Q2). Also, the reset signal can be generated to activate the switch device Q5 at respective zero crossings of the line-frequency signal (e.g., zero crossings of the AC input signal provided at inputs 202 and 204) provided by the power source 206. The switch Q5 thus is controlled to reset the sensor output signal at both high-frequency and low frequency time scales, such as before the power converters high-frequency switching transitions as well as during line frequency zero crossings. As a result, the sensor 114 is configured to provide the sensor signal at 118 to represent only chassis voltage increases or decreases resulting from high-frequency transitions due to switching of Q1 and Q2, as referred to the power ground reference voltage.

As shown in FIG. 3B, the control circuit 120 also includes the switching control 130. As described above, however, the switching control 130 could be external to the control circuit 120. In the example of FIG. 3B, the switching control 130 includes high-frequency PWM control 310 and low-frequency PWM control 312. The high-frequency PWM control 310 includes switching control outputs 314 and 316 coupled to the inputs of respective gate drivers GD_Q1 and GD_Q2. The high-frequency PWM control 310 thus is configured to provide respective switching control signals PWM_Q1 and PWM_Q2, responsive to which gate drivers GD_Q1 and GD_Q2 drive the respective transistors Q1 and Q2. The low-frequency PWM control 312 includes switching control outputs 318 and 320 coupled respectively to inputs of gate drivers GD_Q3 and GD_Q4. The low-frequency PWM control 312 is configured to provide respective switching signals PWM_Q3 and PWM_Q4, responsive to which gate drivers GD_Q3 and GD_Q4 drive respective low-frequency switches Q3 and Q4. In one example, the switching control 130, including control 310 and 312, is implemented by an arrangement of circuit components configured to generate respective PWM signals PWM_Q1, PWM_Q2, PWM_Q3 and PWM_Q4 for controlling the converter 102. In another example, such as where the control circuit 120 is implemented by a microcontroller, the switching control 130, including control 310 and 312, is implemented by instances of functional blocks (e.g., machine-readable instructions) programmed to generate respective PWM signals PWM_Q1, PWM_Q2, PWM_Q3 and PWM_Q4 for controlling the converter 102. The particular implementation of the switching control 130 can vary depending on the configuration of the converter 102 and application requirements.

In the example of FIG. 3B, the switching control output 316 is coupled to input 128 of the timing control and level control circuitry of the control circuit 120. The switching control signal PWM_Q2 thus provides respective timing representative of high-frequency switching transitions of the converter 102, which the control circuit uses to control generation of respective compensation pulses at the output 142 of the amplifier 134. In the example of FIG. 3B, the timing control (e.g., timing control 124 of FIG. 1) includes first and second timing control circuits 330 and 332. First timing control circuit 330 includes a delay (e.g., a circuit or component) 334 configured to delay the switching signal PWM_Q2 and provide a delayed signal to an input of a one shot circuit 336. The amount of delay implemented by delay 334 can be programmable, such as by storing a delay input value in memory (e.g., a register—not shown) or by otherwise configuring delay circuitry. The one shot circuit 336 has an output coupled to an input of timing logic 338, shown as an OR-gate. The one shot circuit is configured to provide a signal pulse, which is delayed from the PWM input signal at 128, to the input of the OR-gate 338. Another input of the OR-gate 338 is configured to receive a low-frequency zero crossing signal (LF_ZC). The OR-gate 338 logically combines (e.g., by performing a logical OR function) the pulse from the one shot 336 with the LF_ZC signal to provide a corresponding timing control signal at the output 339. For example, the timing signal provided at 339 is a digital signal having a value (e.g., ON or OFF).

The second timing control circuit 332 includes an inverter 340 having an input coupled to the input 128 to receive the switching control signal PWM_Q2. The inverter 340 has an output that thus provides an inverted version of the PWM_Q2. The inverter output is coupled to an input of a delay (e.g., a circuit or component) 342, which is configured to impose a time delay on the inverted PWM_Q2 signal. The duration implemented by delay 342 can be programmable, and can be the same or different from the delay implemented by the delay 334. The output of the delay 342 is coupled to an input of another one shot circuit 344. The delayed inverted switching signal thus is provided to activate the one shot circuit 344 to provide a corresponding signal pulse at an output thereof. The output of the one shot circuit 344 is coupled to an input of logic, shown as an AND-gate 346. Another input of the AND-gate is configured to receive an inverted version of LF_ZC, such as by passing the LF_ZC signal through an inverter, to provide the inverted version LF_ZC. The AND-gate 346 has an output 348 coupled to another input of the amplifier 134 to provide a second timing control signal to the amplifier. The timing control circuits 330 and 332 can be configured to ensure that no overlap exists between the respective timing control signals. The duration of the pulses generated by the respective one shot circuits 336 and 344 is controllable.

The level control circuit 126 has an input 122 coupled to the sensor output 118. The level control circuit 126 also includes another input 350 coupled to the output of the inverter 340 and coupled to a delay circuit 352 to receive the inverted PWM_Q2. The delay circuit 352 is configured to provide a delayed version of the PWM_Q2 signal to a sampling circuit, shown as an analog-to-digital converter (ADC) 354. The delay circuit 352 can implement a programmable amount of delay on the signal provided at the input 350. For example, the ADC 354 is configured to sample and hold (e.g., latch) the sensor output signal at the input 122 responsive to the delayed signal provided by the delay circuit 352. The ADC 354 is configured to provide the sampled signal to an input of an integrator 356. The integrator 356 is configured to integrate the sampled signal. For example, the integrator 356 is implemented as a discrete integral controller or a proportional and integral (PI) controller, such as by a microcontroller or discrete PI controller. The integrator 356 thus is configured to integrate the sampled sensor output signal and provide an integrated output to an input of a digital-to-analog converter (DAC) 358. The DAC 358 is configured to convert the integrated sensor output signal to a respective digital value that is provided at the level control output 140 to an input of the amplifier 134.

In an example, the control circuit 120 also includes a reset circuit 360. The reset circuit 360 is configured to generate the reset signal at the output that is coupled to the control input (e.g., gate) of transistor Q5. The reset circuit 360 is configured to generate the reset signal responsive to the high-frequency switching transitions of transistors Q1 and/or Q2 at the SW node, which is coupled to the input 202, as well as responsive to the zero crossing of the input AC voltage. For example, the reset circuit 360 includes a zero-crossing detector 362 having an input coupled to the AC inputs of the converter system. The zero-crossing detector 362 is configured to detect zero crossings in the input AC signal having a line frequency (e.g., 50 Hz or 60 Hz). The zero-crossing detector 362 has an output 364 coupled to an input of logic, shown as an OR-gate 366. Another input of the OR-gate 366 is coupled to the switching control output 316 to receive the PWM_Q2 switching control signal. The OR-gate 366 thus is configured to logically OR the LF_ZC signal (from zero crossing detector 362) with the PWM_Q2 switching control signal to provide the reset at 368.

The amplifier 134 is a circuit configured to provide the compensation pulses at the amplifier output 142 to cancel high-frequency noise (e.g., EMI) at the chassis ground 112. In the example of FIG. 3B, the amplifier 134 includes gate drivers 370 and 372. The gate driver 370 has an input coupled to the timing control output 339, and gate driver 372 has an input coupled to timing control output 346. The output of gate driver 370 is coupled to the gate of the transistor Q6. The output of gate driver 372 is coupled to the gate of another transistor Q7. The source of Q6 is coupled to the output 142 and the drain of Q6 is coupled to a supply voltage shown as VDD. The drain of Q7 is coupled to power ground 110 and the source of Q7 is coupled to a source of another transistor Q8, which is coupled in series between Q6 and Q7. For example, Q6 is implemented as a PFET, and Q7 and Q8 are implemented as NFETs. Thus, the digital outputs provided at 339 and 348 are provided to the inputs of respective gate drivers 370 and 372 for controlling the transistors Q6 and Q7, which operate as respective pull-up and pull-down transistors in the amplifier.

The amplifier 134 also includes a buffer 374 having an input coupled to the level control output 140 and an output coupled to the gate of transistor Q8. The DAC 358 is configured to convert the digital value provided by the integrator 356 to an analog level control signal at 140 supplied to the buffer 374. The buffer 374 has an output coupled to the gate of Q8, and is configured to control the gate-to-source voltage of Q8 (e.g., in the saturation region) responsive to the level control signal provided at 140 by the DAC 358 to control the magnitude of the current pulse conducted through Q8 accordingly.

The amplifier 134 thus is configured as a current source to provide the compensation signal at 114 as a current pulse having a level responsive to the level control output at 140 and having a timing responsive to the switching transitions at SW. For example, when timing control 332 provides a timing pulse (e.g., of controlled duration) at 348 and level control 126 provides a level signal at 140, the gate driver 372 activates Q7, and the buffer provides a gate-to-source voltage of controlled amplitude across Q8, so a negative current pulse having controlled duration and amplitude is generated at 114, flowing through transistor Q8. The negative current pulse pulls down the voltage at 114 by a controlled amount, which is related by the integrator 356 to the amplitude of common mode noise sensed at 118. Conversely, when timing control 330 provides a timing pulse (e.g., of controlled duration) at 339, the gate driver 370 activates Q6, so a positive current pulse of controlled duration is generated at 114, flowing through Q6. The positive current pulse pushes the voltage at 114 to VDD. This sequence of positive and negative current pulses is repeated every switching period of the power converter, such that the voltage at 114 has a net voltage swing related (e.g., proportional) to the amplitude and opposite to the polarity of the sensed common-mode noise. The compensation pulses are provided at discrete times aligned relative to high-frequency switching transitions of the converter 102 (e.g., at SW), so the active filter 100 can be considered to perform discrete-time active filtering to reduce common-mode EMI.

As described herein, the timing of the compensation pulse that is generated is tunable by programming one or more of the respective delays 334, 342 and 352. The timing is derived to closely align the compensation pulses with the switching transitions of the power converter. The timing of the delays may be derived in an open loop or closed loop manner.

As one example, the timing may be determined in an open-loop manner by observing the alignment (e.g., on an oscilloscope or other test equipment) for a given power converter system (e.g., system 300), and the delay can be adjusted until a desired alignment is reached. The timing can be determined responsive to observing the actual alignment between the compensation pulses at respective positive and negative switching transitions or by measuring the common-mode EMI. The foregoing example describes controlling timing of the respective delays 334, 342 and 352 in an open loop manner responsive to the PWM switching controls signals (e.g., PWM_Q2), which provide an indirect measure of the switching transitions at SW. The PWM signals provide an indirect measure of the switching transitions because a propagation delay usually exists between the PWM signals and the actual switching transitions (e.g., due to gate drivers). The propagation delay can vary with different parts, temperature, aging and the like.

In an alternative example, the system 300 can include timing measurement circuitry (not shown) configured to measure the timing of switching transitions at SW directly and provide respective switching signals representative of the measured timing. The control circuit can be configured to time the compensation pulses directly responsive to the respective switching signals—without the need for using PWM signals and delays. This alternative example is a closed-loop timing variant because if the switching transitions were delayed or advanced due to any changes in the converter, the control circuit is configured to automatically track such changes.

Figure 4:
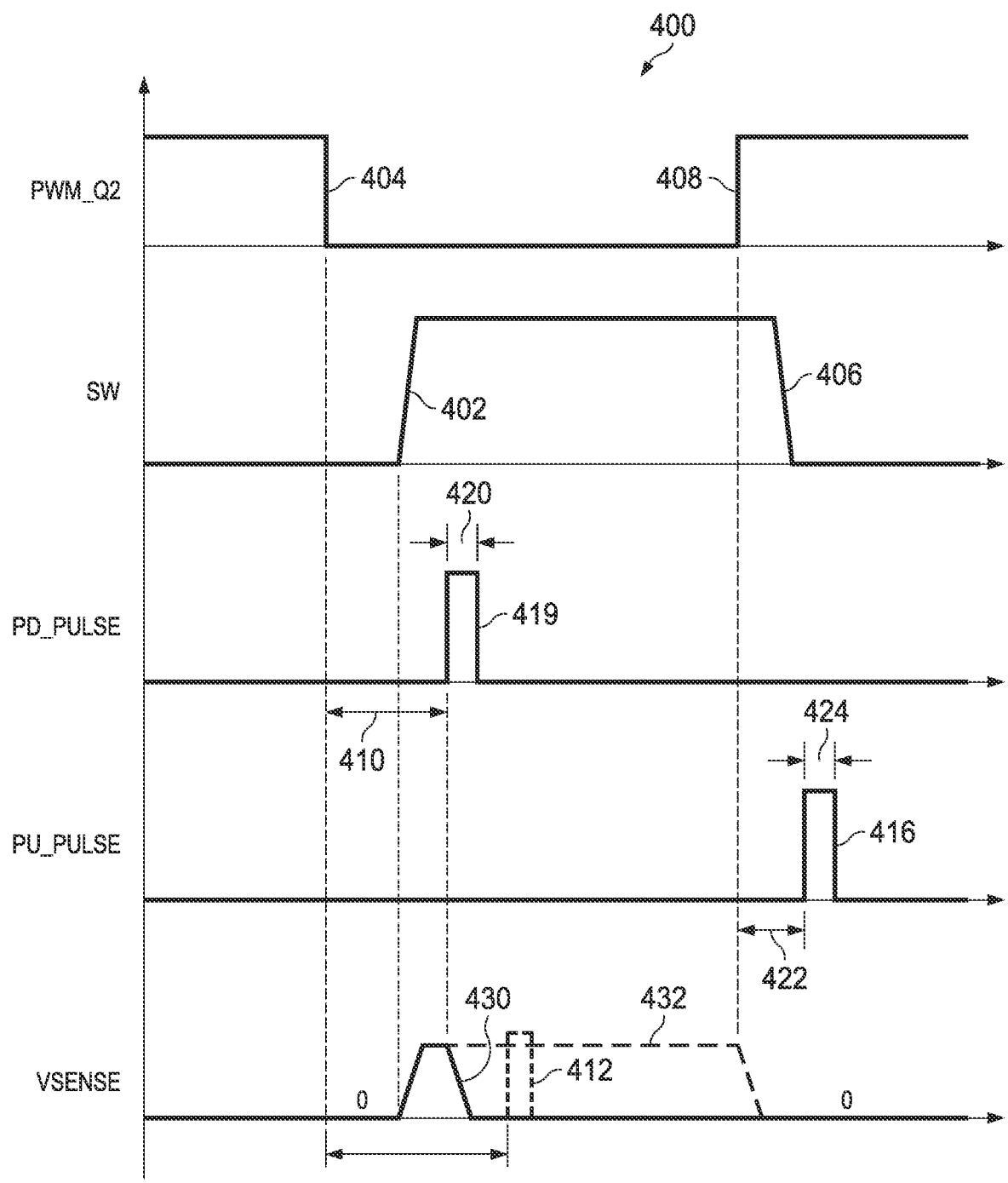
FIG. 4 is a signal diagram showing example signals for the circuit of FIGS. 3A and 3B.

FIG. 4 is a signal diagram 400 illustrating example signals in the power converter system 300 of FIGS. 3A and 3B. Accordingly, the following description of FIG. 4 also refers to FIGS. 3A and 3B. The signals include switching signal PWM_Q2. In the example of FIG. 4, PWM_Q2 is used to control timing of compensation pulse signals provided by the amplifier 134, shown as pull-down pulse (PD_PUSLE) 414 and pull-up pulse (PU_PUSLE) 416. In other examples, one or more different switching signals can be used.

The signal diagram 400 also shows the voltage at the high-frequency switch node SW, which includes a rising edge 402 following the falling edge PWM_Q2, shown at 404. The high-frequency switch node SW also includes a falling edge 406 responsive to the rising edge 408 of PWM_Q2. The voltage at SW thus presents as an inverted version of PWM_Q2 with some delay (e.g., due to propagation delay through the gate driver). As described herein, the transitions at the high-frequency switch node SW (402 and 404) introduces common-mode EMI noise to the chassis through parasitic capacitances 216.

The programmable delay component 352 imposes a delay, shown as 410, responsive to the falling edge 404 of PWM_Q2. Following the delay 410, the ADC 354 is triggered to sample the sense chassis voltage, shown at 412. As described above, the duration of the delay at 410 is programmable. For example, the value for the delay can be programmed by setting a register value that is stored in memory of a microcontroller. Alternatively, when the control circuit is implemented by discrete circuitry, the delay may be programmed (e.g., using delay lines) to configure circuit 352 to implement the desired amount of delay. Thus, the delay 410 provides a sampling delay to control when the level control circuit samples the sensed chassis voltage VSENSE, shown at 412.

As also shown in FIG. 4, the timing of the PD_PULSE is delayed by a delay time, shown as 418, implemented by delay 342 responsive to the falling edge 404 of PWM_Q2. The amount of delay 418 may be programmable as a digital value (e.g., stored in memory) within a microcontroller or using discrete delay line circuits. The width of the PD_PULSE pulse 414 is shown at 420, and may be programmable, such as by configuring the one shot circuit component 344. For example, a value of the pulse width for PD_PULSE may be stored as a digital value in memory of a microcontroller implementing the control circuit 120. Alternatively, where the control circuit 120 is implemented by discrete circuitry, the pulse width may be programmed according to the implementation of such circuitry (e.g., using discrete one-shot ICs with RC circuits that program the one shot pulse duration). The control circuit thus is configured to control the start time and pulse width of PD_PULSE 419 that is provided at the output 348 to the amplifier 134.

As described, the sensor 114 is configured to sense the chassis voltage VSENSE, shown at 430, which tracks the voltage at the high-frequency switch node SW. For example, the sensed chassis voltage 430 goes high at the rising edge 402 of the voltage at SW. Also, as shown in the example of FIG. 4, the sensed chassis voltage 430 goes low when PD_PULSE 419 is high, which activates the reset transistor Q5 responsive to the RESET signal. Also, as shown by a dotted line at 432, FIG. 4 shows an example of how the sensed voltage VSENSE would appear without the action of PD_PULSE, including that VSENSE would go low responsive to the rising edge of PWM_Q2 shown at 408.

FIG. 4 also illustrates PU_PULSE 416 delayed from the rising edge 408 of the switching control signal PWM_Q2 by a delay amount, shown at 422. The delay 422 is implemented by delay 334 responsive to the rising edge 408 of PWM_Q2. PU_PULSE 416 also includes a pulse width 424. The pulse width 424 may be programmable by configuring the one shot circuit 336 accordingly. By injecting current pulses to the chassis 112 responsive to pulses 414 and 416, jumps in chassis voltage can be reduced or cancelled.

Figure 5:
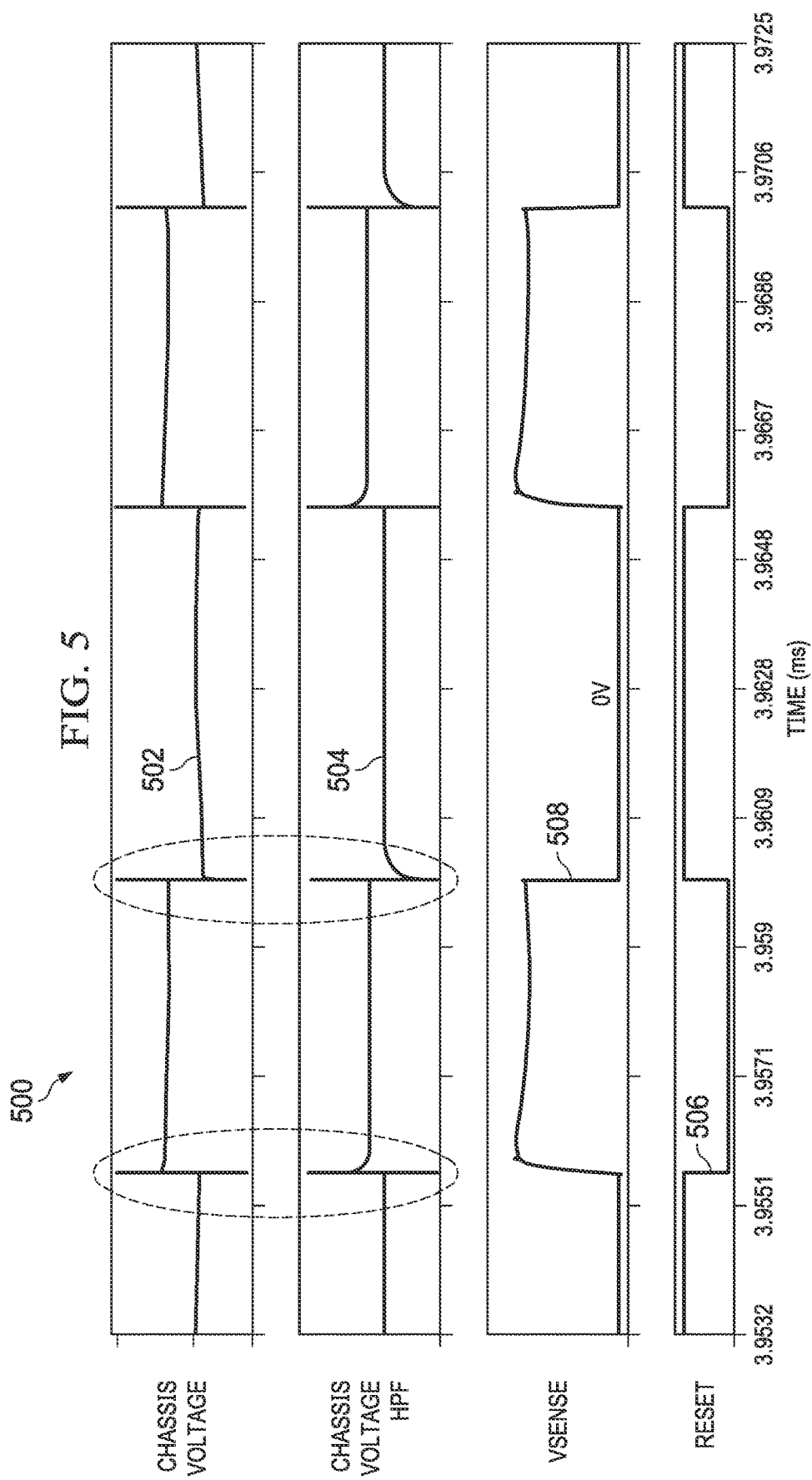
FIG. 5 is a signal diagram showing signal waveforms at a high-frequency switching frequency timescale.
Figure 6:
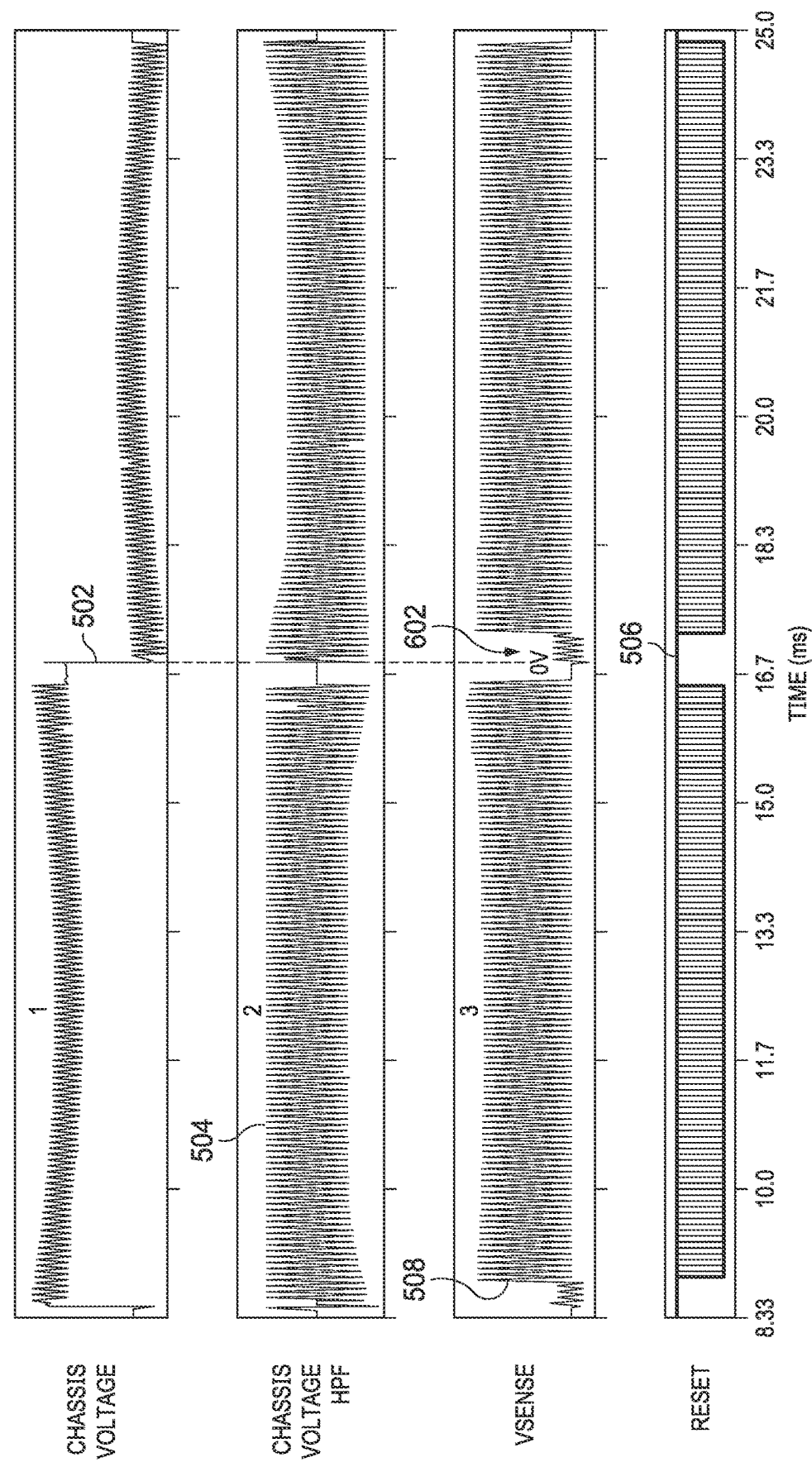
FIG. 6 is a signal diagram showing example signal waveforms for the circuit of FIGS. 3A and 3B at a line frequency timescale.

FIGS. 5 and 6 are signal diagrams 500 and 600, respectively, showing example signals in the system 300 of FIGS. 3A and 3B related to the operation of the sensor 114 for sensing the chassis voltage. Accordingly, the descriptions of FIGS. 5 and 6 also refer to FIGS. 3A and 3B.

As shown in FIG. 5, the signal diagram 500 represents signals in the high-frequency time scale for high-frequency power transistors Q1 and Q2. The signal diagram 500 thus includes the chassis voltage 502, representative of the voltage at the chassis 112, and the sensed chassis voltage 504, representative of a voltage at the sensor output 118 between C1 and R1 following high-pass filtering performed by C1. The reset signal pulse is shown at 506 representative of the signal provided at 368 to the gate of transistor Q5 from the reset circuitry 360. As described herein, the reset signal is asserted to activate the transistor Q5 and couple the sensor output 118 to power ground 110 responsive to the switching control signal PWM_Q2 (in the high-frequency time scale of FIG. 5). Thus, when PWM_Q2 goes low, transistor Q5 is turned off, and the sensor 114 provides the sense signal at the sensor output 118, which is shown as the sensed voltage VSENSE 508, responsive to the chassis voltage at 112. As described herein, the sensed voltage VSENSE 508 is provided to an input of an ADC 354, which is sampled at a time set by the delay 410. When PWM_Q2 goes high the reset signal follows to return the VSENSE signal to approximately zero volts. Because Q5 is configured to reset the sensed voltage VSENSE to the converter high-frequency switching edges, as shown in FIG. 5, the sensed voltage 508 has a magnitude representative of only the fluctuations due to the noise that is introduced by high-frequency switching.

The timing diagram 600 of FIG. 6 shows the same signals 502, 504, 506 and 508 as shown in FIG. 5, but for the lower frequency time scale related to the line frequency for the AC input voltage (e.g., provided by power source 206). Thus, each of the chassis voltage 502, the filter chassis voltage 504 and the sensed voltage 508 include numerous switching intervals according to switching transitions of the high-frequency transistors Q1 and Q2. As described herein, in the low-frequency time scale, the reset circuit 360 is also configured to provide the reset signal 506 responsive to detecting a line frequency zero crossing to reset the sensed voltage VSENSE, as shown at 602. Responsive to resetting the sensor output 118, VSENSE is coupled to power ground 110 (e.g., zero volts). As a result, switching noise associated with such low-frequency transitions between Q3 and Q4 is effectively removed from VSENSE.

Figure 7:
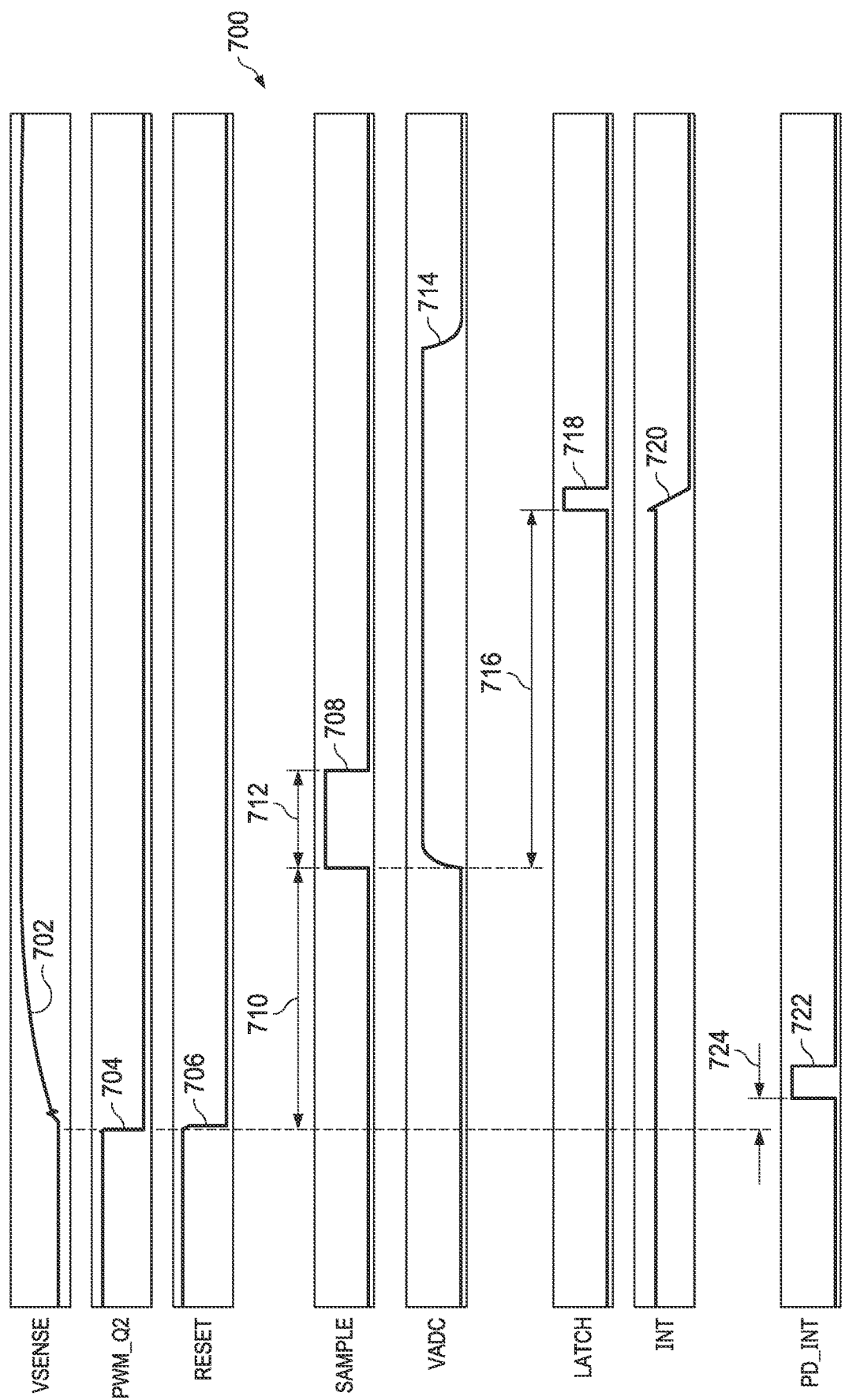
FIG. 7 is an example timing diagram showing example waveforms related to sensing and noise cancellation performed by the circuit of FIGS. 3A and 3B.

FIG. 7 is a signal diagram demonstrating timing related to sampling and generating injection control signals for controlling the compensation pulse signals. The signal diagram 700 includes a VSENSE signal 702, the switching signal PWM_Q2 704 and a reset signal 706. As described herein, the reset circuit 360 is configured to provide the reset signal 706 responsive to the switching control signal PWM_Q2 704 and LF_ZC (not shown). Thus, in response to the PWM_Q2 signal going from high to low, shown at 705, the reset signal 706 also goes low. When the reset signal 706 goes low (representative of the reset condition ending), the VSENSE signal at the sensor output 118 increases responsive to the chassis voltage at 112. The ADC 354 is configured to receive a sample signal pulse 708 to control acquisition of the VSENSE signal 702. For example, delay circuit 352 is configured to delay the sample pulse 708 by an amount, shown as 710, responsive to the inverted PWM_Q2 signal going high (or PWM_Q2 going low). The sample pulse 708 has a duration 712 to control the sampling time by the ADC 354. One or both of durations 710 and 712 can be programmable, as described herein.

The ADC 354 thus is triggered to sample the sensor voltage VSENSE, shown as VADC 714 responsive to the sample pulse 708. VADC 714 thus is representative of the sampled sensor voltage. After a duration 716 from triggering the ADC 354 to sample VSENSE, a latch pulse 718 is provided to latch and hold the sampled VADC signal 714 for further processing by the level control circuit 126. Responsive to the latch pulse 718, the input the integrator circuit 356 is also updated shown at 720. FIG. 7 also shows the pull down control signal (PD_INJ), which is provided responsive to the switching control signal PWM_Q2 704 following a delay 724, which can be programmable.

Figure 10:
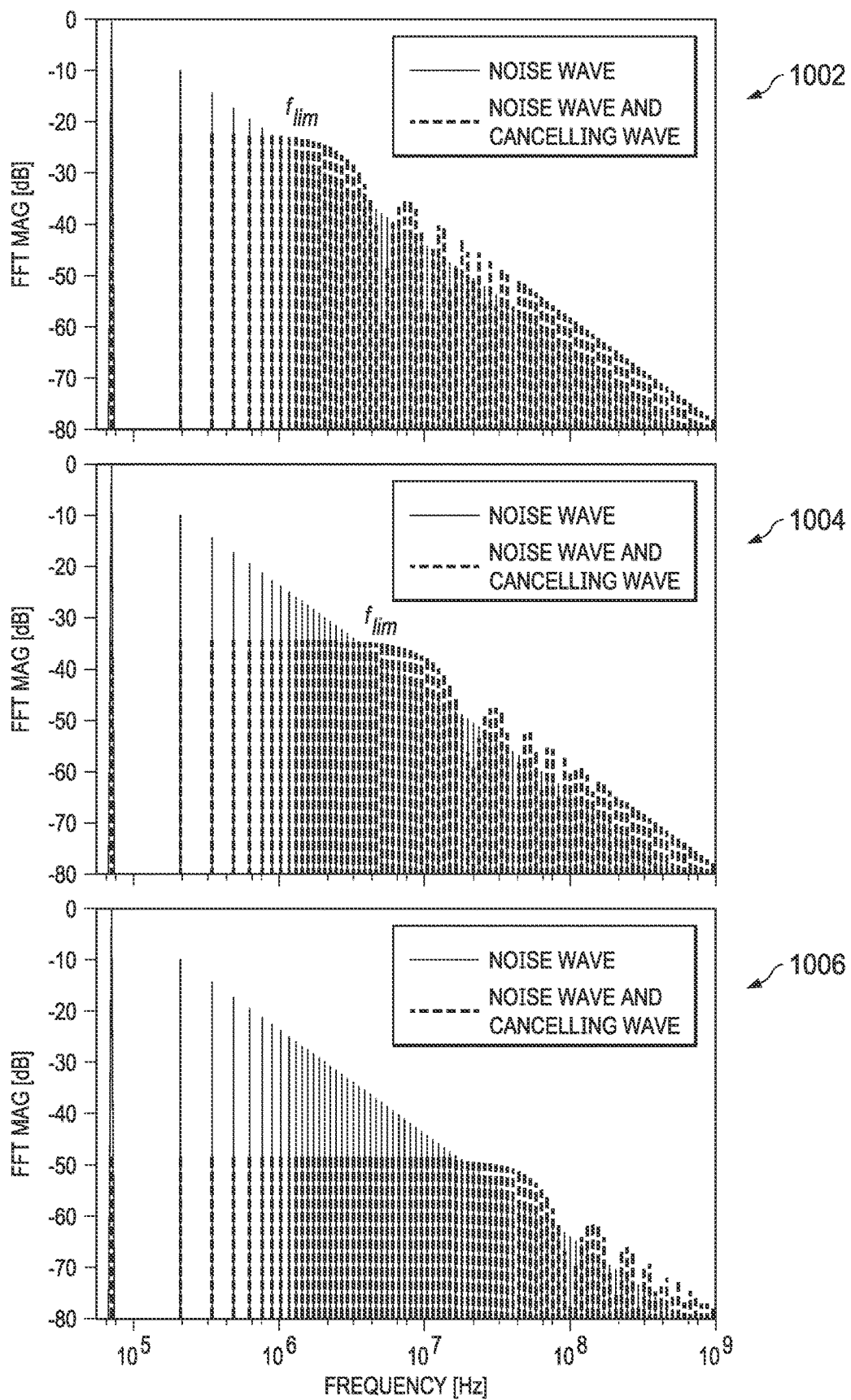
FIG. 10 depicts examples of EMI noise and compensation signals for different levels of injection delay used for applying compensation pulse signals.

FIGS. 8, 9 and 10 are examples of idealized signal diagrams to illustrate the impact of the compensation pulse injection on the common-mode noise. FIG. 8 is an idealized signal diagram 800 showing separately the chassis voltage 802 and the injected compensation pulses 804. As shown, the injected compensation pulses 804 exhibit a small amount of delay between the rising edge of the chassis voltage and the falling edge of the compensation pulse 804. Similarly, a small amount of injection delay exists from the falling edge of the chassis voltage 802 and the rising edge of the injected compensation pulse 804. FIG. 9 shows the resulting chassis voltage waveform 902 after compensation (e.g., the combination of the chassis voltage and cancelling waveforms) representative of the difference between the chassis voltage and the injection compensation pulses. FIG. 10 includes graphs 1002, 1004 and 1006 showing noise as a function of frequency. The active filter 100 can reduce noise up to a frequency limit, and the injection delay of the compensation pulses can impact the frequency limit and overall noise cancellation function of the active filter over frequency. The graph 1002 illustrates the noise cancellation effect for an active EMI filter implementing a high amount of injection delay (e.g., about 200 ns). The graph 1004 illustrates an intermediate amount of injection delay resulting in additional noise cancellation in a lower frequency range. The graph 1006 is shown for an even lower injection delay that is implemented, which results in less noise cancellation for a larger low frequency range. Thus in each of the graphs 1002, 1004 and 1006 noise is lowered up to a frequency limit that is inversely proportionally to the injection delay.

Figure 11:
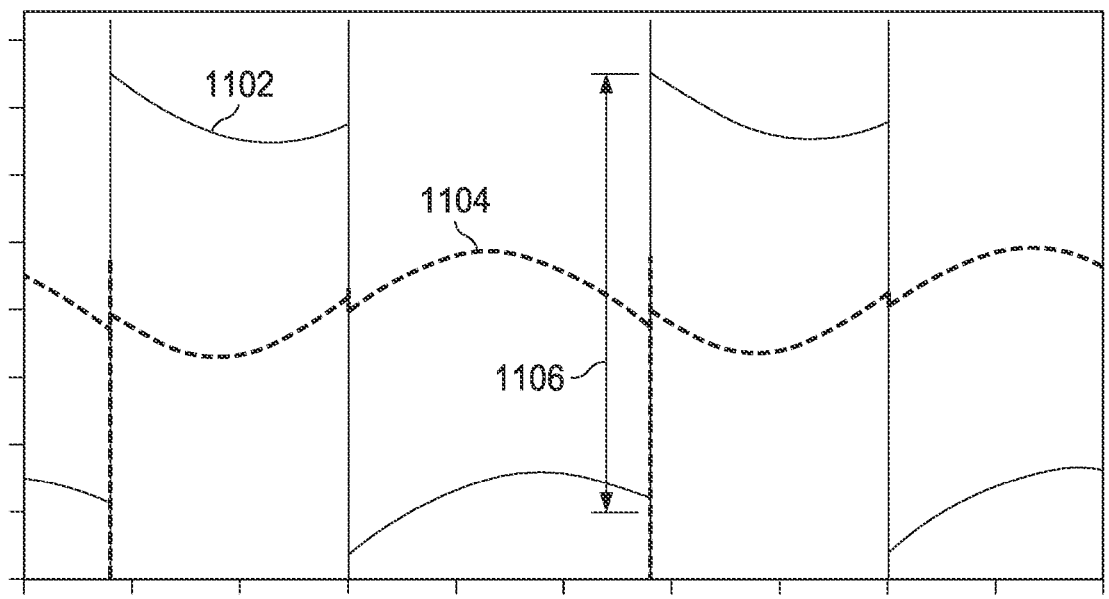
FIG. 11 depicts an example showing a comparison of chassis voltage with and without active filtering.

FIG. 11 illustrates a signal diagram 1100 showing chassis voltage without cancellation 1102 and chassis voltage with cancellation shown at 1104, obtained from a circuit simulator. The chassis voltage with cancellation 1104 results from injection of compensation pulses by the active filter 100 as described herein. The jump in chassis voltage magnitude that is cancelled by the active filter 100 is demonstrated at 1106.

Figure 12:
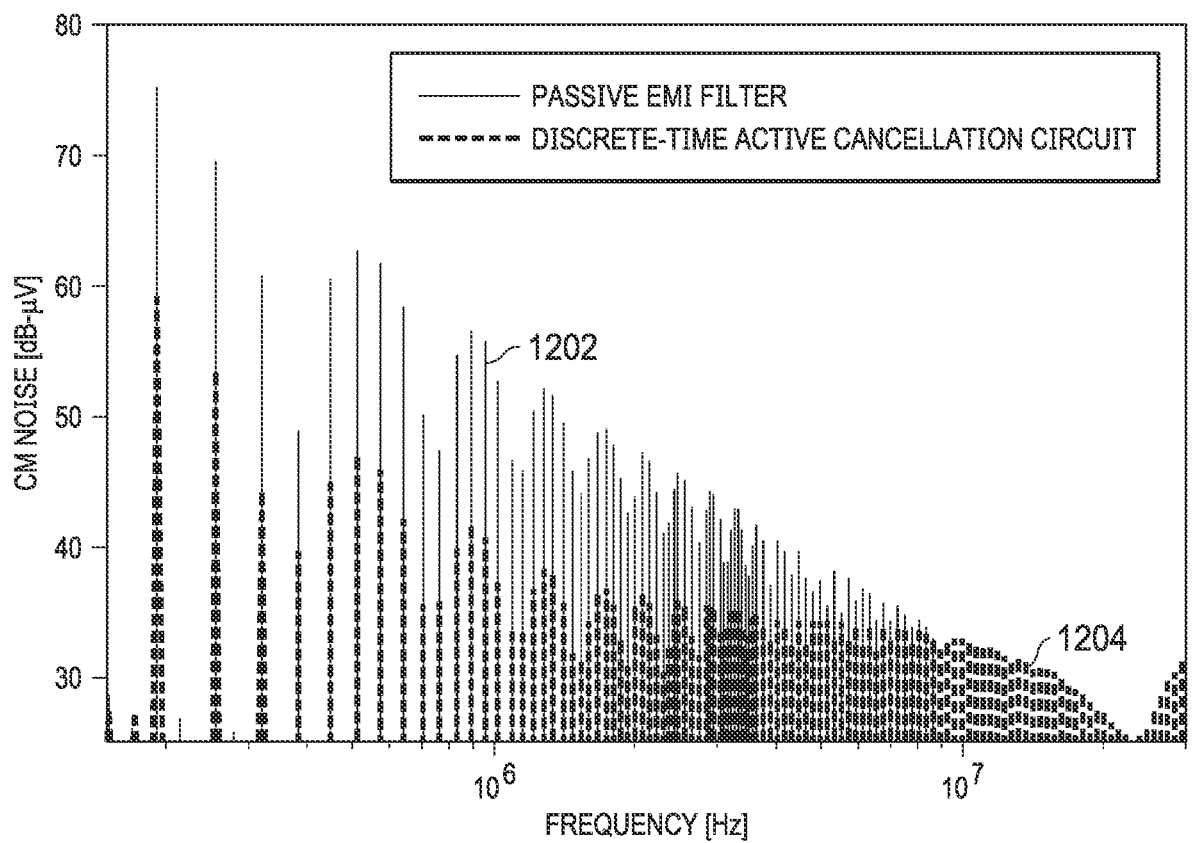
FIG. 12 is a plot of common node noise as a function of frequency showing effects of both passive and active EMI filtering.

FIG. 12 is a graph 1200 of common-mode noise due to switching transitions of a power converter, such as the converter 102, plotted against frequency, corresponding to the cancellation depicted in FIG. 11. The graph 1200 depicts the impact of a passive EMI filter (e.g., passive filter 208 without an active filter present), shown at 1202, and the contribution due to an active EMI filter (e.g., active filter 100 together with passive filter 208), shown at 1204. The graph 1200 shows how the active EMI filter substantially reduces noise at the lower end of the shown frequency range. Because the passive filter size is determined by the noise in this range, inclusion of the active filter 100 allows the passive filter 208 to be reduced in size and correspondingly in cost.

Referring back to FIGS. 3A and 3B, the power converter system 300 further may exhibit ringing at the chassis ground, shown as 380, at hard switching transitions of the SW node. In the totem-pole boost PFC converter shown in FIG. 3A, when operated in a continuous-conduction mode, the current in inductor L3 remains positive in every switching period during the positive half of the AC line cycle, and remains negative in every switching period during the negative half of the AC line cycle. Therefore, in the positive half cycle, the current in L3 cannot discharge the output capacitance of Q2, so the turn-ON transition of Q2 is a hard switching transition. Similarly, the turn-ON transition of Q1 is a hard switching transition in the negative half of the line cycle. Because these hard switching transitions involve large voltage swings (e.g., 400V or higher) in short timescales (e.g., less than 10 ns), the hard switching transitions can cause substantial ringing at the chassis. The resultant current injection that occurs at such hard switching transitions, if not taken into account, could result in increased drain voltage and thereby adversely affect the function of transistors Q5 of the sensor 114 and Q8 of the amplifier 134. For example, the increase in drain voltage responsive to such ringing may cause spurious switching of the reset transistor Q5 as well as prevent the injection transistor Q8 from remaining in saturation.

Figure 13:
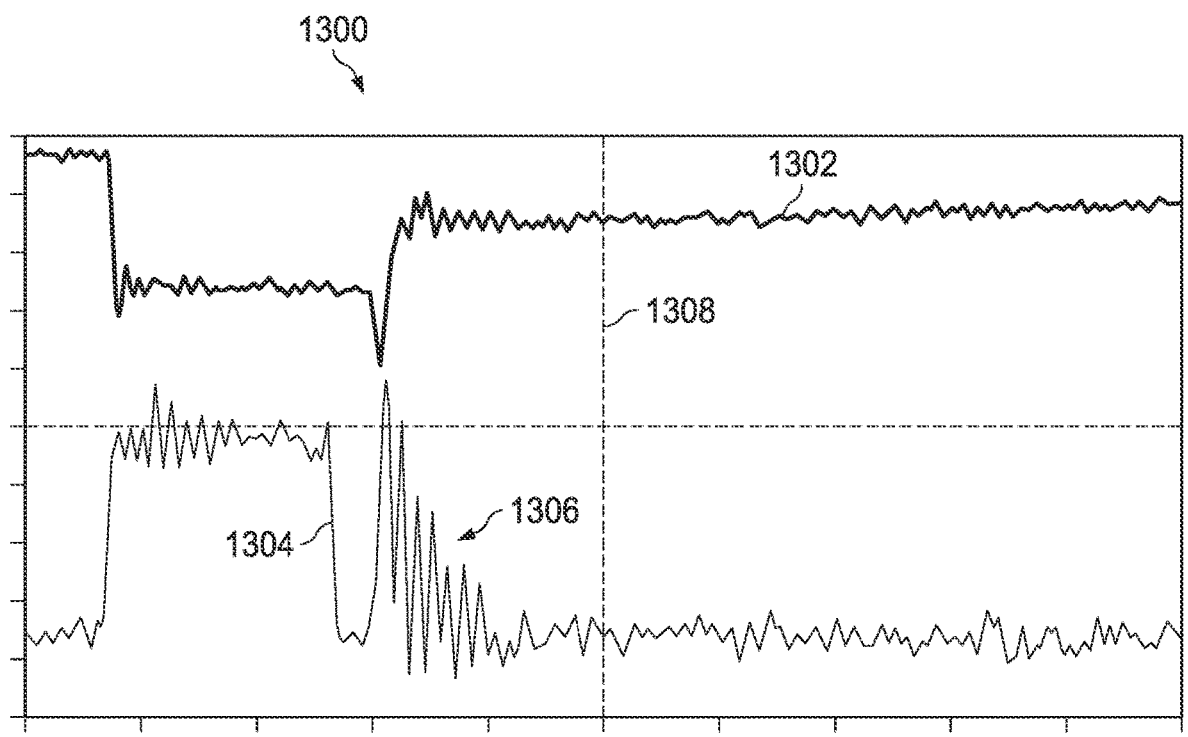
FIG. 13 is a signal diagram showing examples of sensor and reset signals responsive to noise and ringing at the chassis.

As an example, FIG. 13 illustrates a signal diagram 1300 showing the sensor voltage 1302 and the reset signal 1304. The spurious switching of the reset signal 1304 responsive to the high-frequency switching and ringing 1306 that occurs at the chassis 112 can result in the sensor voltage 1302 having an incorrect value (e.g., not representative of injected EMI), if sensed during such ringing. For example, in a totem-pole PFC converter, such as converter 102 of FIG. 3A, the ringing 1306 occurs during the negative half of the line cycle, namely where the low-high transition is hard switched. Also, the ringing 380 that propagates to the drain of the transistor Q5 may also cause spurious switching of Q5. For example, in order to reduce the effects of the chassis voltage and spurious switching of Q5, responsive to ringing 380 during hard switching transitions, the level control circuit 126 is configured to use the VSENSE signal sensed during soft switching transitions for controlling the injection level for both hard and soft switching transitions throughout each respective line cycle.

Figure 14:
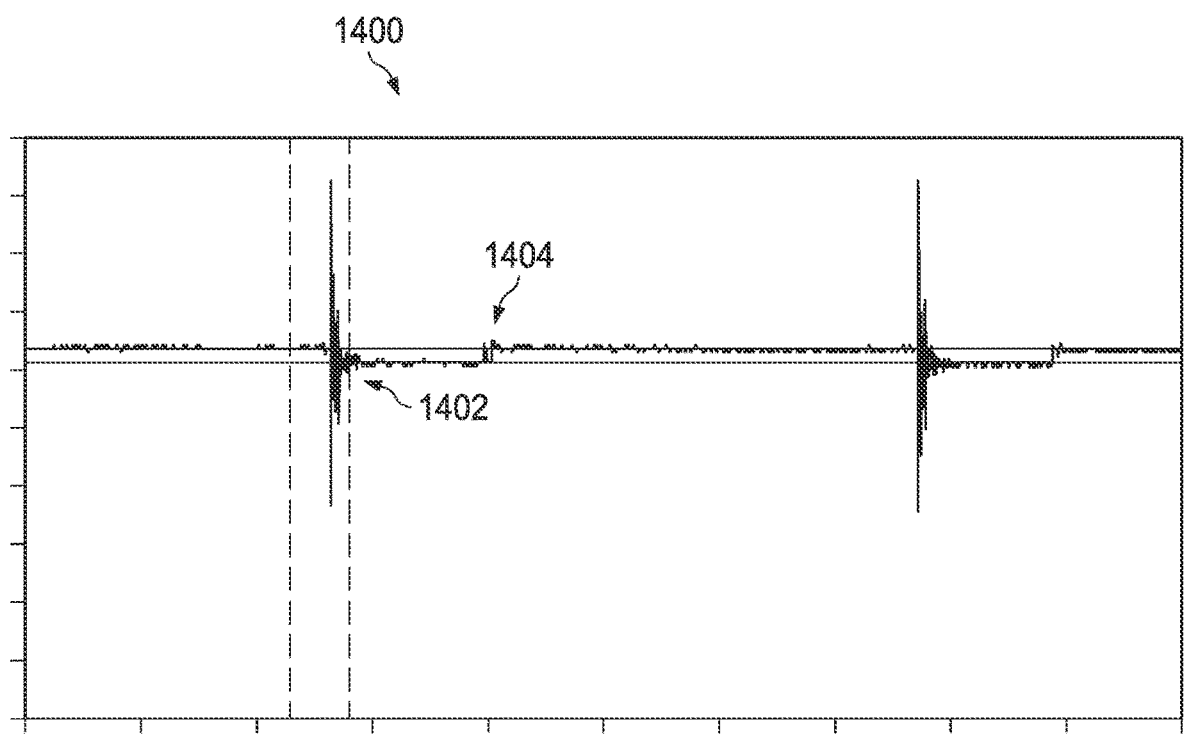
FIG. 14 is a signal diagram showing the chassis voltage responsive to hard and soft switching transitions for a positive half of a line cycle of an AC input voltage applied to a power converter.
Figure 15:
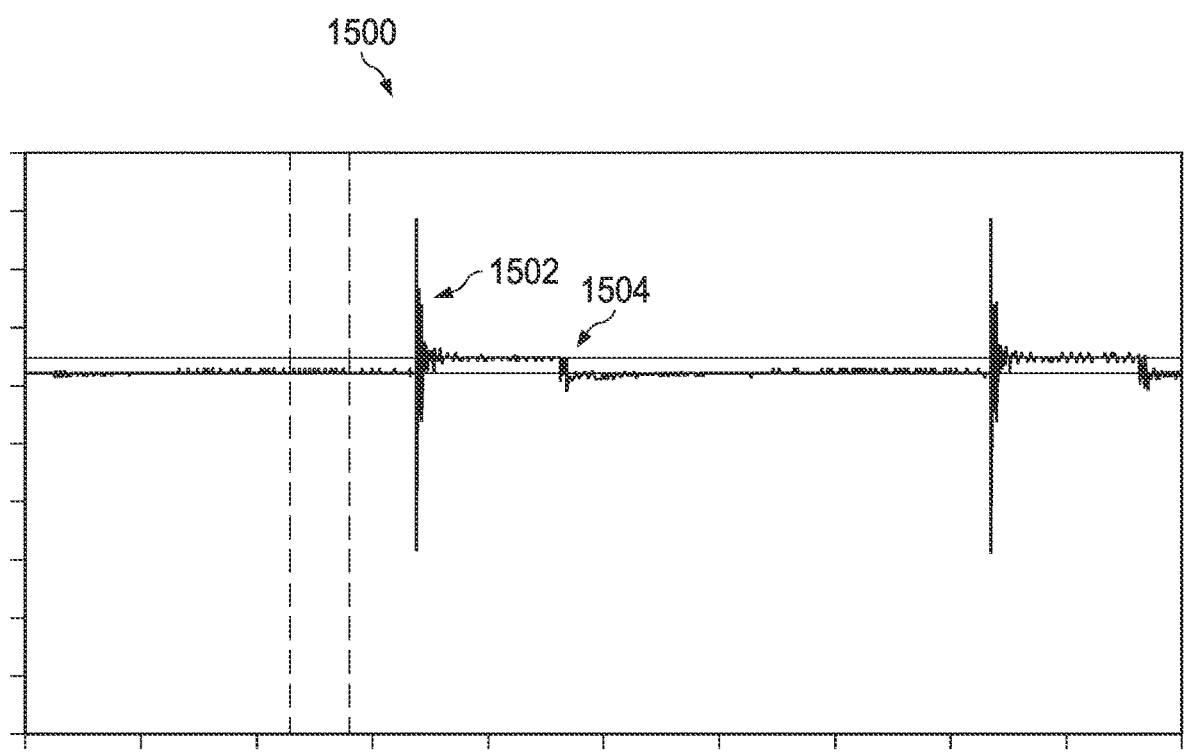
FIG. 15 is a signal diagram showing the chassis voltage responsive to hard and soft switching transitions for a negative half of a line cycle of an AC input voltage applied to a power converter.

For example, the ADC 354 is configured to sample VSENSE during a soft switching transitions (see, e.g., transitions 1404 and 1504 of FIGS. 14 and 15 for the different halves of the AC voltage line cycle). The integrator 356 is configured to integrate the sampled VSENSE and provide an integrated output of for the soft switching transition. The level control circuit 126 further can include a register or other memory configured to store a value representative of the integrated VSENSE for the soft switching transition. The stored value for the integrated VSENSE can them be provided to the DAC 358, which converts the stored value to a respective analog voltage having a magnitude to control the level of the compensation pulse. In one example, the stored value for VSENSE can be overwritten (or reset) for each high-frequency line cycle, and the VSENSE value for each respective soft switching transition can be can be sampled and stored for use during the next high-frequency line. In another example, the stored value can be reset responsive to VSENSE sampled during one more soft switching transitions for each line cycle. For example, the stored value for VSENSE represents a single sample during the line cycle or an average value of multiple samples, and the stored measured value for can be sampled and stored for use throughout a respective line cycle. In another example, the level control circuit 126 is configured to use different injection levels for the compensation pulses generated for respective hard and soft switching transitions.

Additionally or alternatively, the control circuit 120 can be configured to control timing of the compensation pulses responsive to whether a given high-frequency switching transition is a hard or soft switching transition. For example, the control circuit 120 is configured to determine whether a high-frequency switching transition is a hard or soft switching transition responsive to sensing the polarity of the input AC voltage (positive half or negative half of the cycle) in conjunction with information identifying to which switch node transition (Q1 turning ON or Q2 turning ON) the active filter is responding. For example, the switch node transition information is known through the PWM pulses in a microcontroller implementation, or can be extracted by sensing the switch-node voltage in a discrete implementation (e.g., using a high-pass filter circuit). In an example, the timing control circuits 330 and 332 are configured to implement respective delays 334 and 342 with increased durations sufficient to enable ringing 380 to subside during hard switching transitions. In an additional or alternative example, the timing control circuits 330 and 332 are configured to implement respective delays 334 and 342 with a shorter duration during soft switching transitions (as compared to the hard switching transitions) to allow compensation pulse injection to occur earlier during soft switching transitions to maximize the cancellation effect. In another example, the timing control circuits 330 and 332 are configured to implement respective delays 334 and 342 with the same duration during both hard and soft switching transitions.

For example, the control circuit 120 may be implemented as a microcontroller. In the microcontroller example, the microcontroller can include software blocks preconfigured to execute instructions shown and described in FIG. 3B. For example, in responsive to such instructions be programmed to perform PWM sensing, pulse generating and other functions. An example of a programmable microcontroller is the C2000 Microcontroller available from Texas Instruments Incorporated. Other microcontrollers and types of circuits (e.g., field programmable gate arrays, application specific integrated circuits and the like) may be used in other examples.

FIG. 14 is a signal diagram 1400 of chassis voltage at 112 during a positive half of the input AC voltage cycle, showing a hard switching transition 1402 and a soft switching transition 1404. In the example of FIG. 14, the hard switching transition 1402 occurs during a falling edge, responsive to the turn-ON transition of Q2, and the soft switching transition 1404 occurs during a rising edge, responsive to the turn-ON transition of Q1. As shown, the hard switching transition 1402 includes significant ringing compared to the soft switching transition 1404. Accordingly, the duration of delays (e.g., implemented by delay 334 and 342) may be programmed to delay injection of the compensation pulse for a duration until after ringing subsides for at least the hard switching transitions 1402.

FIG. 15 is a signal diagram 1500 showing the chassis voltage for a negative half of an input AC voltage cycle. The hard switching transition 1502 occurs during a rising edge, responsive to the turn-ON transition of Q1, and the soft switching transition 1404 occurs during a falling edge, responsive to the turn-ON transition of Q2. Again, the hard switching transition 1502 includes significant ringing compared to the soft switching transition 1504, and can be accommodated by appropriately delaying injection of the compensation pulse. Thus, as described above, the timing control circuits 330 and 332 can be configured to provide respective timing control signals at 339 and 348 to delay the injection of compensation pulses until the ringing 380 has sufficiently subsided for each of the positive half of the line cycle and in the negative half of the cycle. The amount of delay that is implemented can vary depending upon the amount of ringing, which may be measured by test equipment. The amount of ringing further may depend on the switch node dV/dt characteristics of the chassis voltage as well as the parasitic LC's of the power converter system. As a further example, in a totem-pole PFC converter, during the positive half of the line cycle, the control circuit is configured to delay injection of the compensation pulse for high-to-low switching transitions (e.g., falling edges) of the chassis voltage and, during the negative half of the line cycle, the control circuit is configured to delay injection of compensation pulses for the low-to-high switching transitions (e.g., rising edges).

In this description, the term "couple" or "coupled" means either an indirect or direct wired or wireless connection. For example, if a first device, element, or component couples to a second device, element, or component, that coupling may be through a direct coupling or through an indirect coupling via other devices, elements, or components and connections. Similarly, a device, element, or component that is coupled between a first component or location and a second component or location may be through a direct connection or through an indirect connection via other devices, elements, or components and/or couplings. A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is described herein as including certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or IC package) and may be configured to couple to at least some of the passive elements and/or the sources to form the described structure either at a time of manufacture or after a time of manufacture, such as by an end-user and/or a third-party.

Components illustrated as resistors, unless otherwise stated, are generally representative of any one or more elements coupled in series and/or parallel to provide an amount of impedance represented by the illustrated resistor. For example, a resistor or capacitor illustrated and described herein as a single component may instead be multiple resistors or capacitors, respectively, coupled in parallel between the same nodes. As another example, a resistor or capacitor illustrated and described herein as a single component may instead be multiple resistors or capacitors, respectively, coupled in series between the same two nodes as the single resistor or capacitor.

Modifications are possible in the described embodiments, and other embodiments are possible, within the scope of the claims.

What is claimed is:

1. A circuit comprising:
   a sensor having a sensor input and a sensor output;
   a controller having a control input, a timing control output and a level control output, the control input coupled to the sensor output; and
   a signal generator having a timing control input, a level control input, and a signal generator output, the level control input coupled to the level control output of the controller, the timing control input coupled to the timing control output, the signal generator output to the sensor input, and the signal generator configured to:
      set a magnitude of a noise compensation signal responsive to a level control signal at the level control input; and
      provide the noise compensation signal having the magnitude at the signal generator output responsive to a timing control signal at the timing control input.

2. The circuit of claim 1, wherein the sensor includes:
   a filter coupled between the sensor input and a ground terminal; and
   a switch coupled between the sensor output and the ground terminal, the switch having a switch control terminal, and the switch configured to set a state of the sensor output responsive to a reset signal at the switch control terminal.

3. The circuit of claim 2, further comprising a reset circuit having a switching input and a reset output, the reset output coupled to the switch control terminal of the switch, and the reset circuit configured to provide the reset signal responsive to a switching signal at the switching input.

4. The circuit of claim 3, wherein the reset circuit has alternating current (AC) inputs and configured to:
   detect a zero crossing of an AC voltage signal across the AC inputs; and
   provide the reset signal at the reset output responsive to the detected zero crossing.

5. The circuit of claim 1, wherein the control input is a first control input, the timing control output is a first timing control output, the timing control input is a first timing control input, the timing control signal is a first timing control signal, the signal generator has a second timing control input, the controller has a second control input and a second timing control output, the second timing control output coupled to the second timing control input, and the controller configured to:
   receive a first switching signal at the second control input;
   generate a second switching signal as an inverted version of the first switching signal;
   provide the first timing control signal at the first timing control output responsive to the first switching signal; and
   provide a second timing control signal at the second timing control output responsive to the second switching signal.

6. The circuit of claim 5, wherein the controller includes:
   first delay circuitry coupled between the second control input and the first timing control output; and
   second delay circuitry coupled between the second control input and the second timing control output.

7. The circuit of claim 3, wherein the controller further comprises a level control circuit having a processing input, a timing input, and a processing output, the processing input coupled to the control input, the processing output coupled to the level control output, and the level control circuit configured to:
   receive the switching signal at the timing input;
   sample a sensor signal at the processing input responsive to the switching signal; and
   provide the level control signal at processing output responsive to the sampled sensor signal.

8. The circuit of claim 7, wherein the level control circuit comprises:
   an analog-to-digital converter having a digital output, a sampling input, and a trigger input, the sampling input coupled to the processing input;
   an integrator having an integrator input and an integrator output, the integrator input coupled to the digital output;
   a digital-to-analog converter having a digital input and an analog output, the digital input coupled to the integrator output, and the analog output coupled to the processing output; and
   delay circuitry having a delay input and a delay output, the delay input coupled to the timing input, and the delay output coupled to the trigger input.

9. The circuit of claim 5, wherein the signal generator includes:
   a first transistor coupled between a power terminal and the signal generator output, the first transistor having a first control terminal coupled to the first timing control input;
   a second transistor coupled to the signal generator output, the second transistor having a second control terminal coupled to the level control input; and
   a third transistor coupled between the second transistor and a ground terminal, the third transistor having a third control terminal coupled to the second timing control input.

10. The circuit of claim 1, wherein the controller includes a microcontroller.

11. The circuit of claim 5, wherein the signal generator is configured to:
   provide the noise compensation signal having a first polarity responsive to the first timing control input; and
   provide the noise compensation signal having a second polarity responsive to the second timing control input, in which the second polarity is opposite to the first polarity.

12. The circuit of claim 6, wherein the first delay circuitry includes a first delay programming input, and the second delay circuitry includes a second delay programming input.

13. A system comprising:
   a power converter including a conductor;
   a sensor having a sensor input and sensor output, the sensor input coupled to the conductor;
   a controller having a control input, a timing control output, and a level control output, the control input coupled to the sensor output; and
   a signal generator having a signal generator output, a timing control input, and a level control input, the signal generator output coupled to the conductor, the timing control input coupled to the timing control output, the level control input coupled to the level control output, and the signal generator configured to:
      set a magnitude of a noise compensation signal responsive to a level control signal at the level control input; and provide the noise compensation signa having the magnitude at the signal generator output responsive to a timing control signal at the timing control input.

14. The system of claim 13, wherein the sensor includes:
a filter coupled between the sensor input and a ground terminal; and
a switch coupled between the sensor output and the ground terminal, the switch having a switch control terminal, and the switch configured to set a state of the sensor output responsive to a reset signal at the switch control terminal.

15. The system of claim 14, wherein the power converter has a power converter control input and power inputs;
wherein the system further comprises a reset circuit having a switching input and a reset output, the switching input coupled to the power converter control input and the power inputs, the reset output coupled to the switch control terminal, and the reset circuit configured to provide the reset signal responsive to at least one of:
a switching signal at the power converter control input; or a zero crossing of an AC voltage signal across the power inputs.

16. The system of claim 13, wherein the power converter has a power converter control input; and
wherein the control input is a first control input, the timing control output is a first timing control output, the timing control input is a first timing control input, the timing control signal is a first timing control signal, the signal generator has a second timing control input, the controller has a second control input and a second timing control output, the second timing control output coupled to the second timing control input, and the controller configured to:
receive a first switching signal at the second control input;
generate a second switching signal as an inverted version of the first switching signal;
provide the first timing control signal at the first timing control output responsive to the first switching signal; and
provide a second timing control signal at the second timing control output responsive to the second switching signal.

17. The system of claim 16, wherein the controller includes:
first delay circuitry coupled between the second control input and the first timing control output; and
second delay circuitry coupled between the second control input and the second timing control output.

18. The system of claim 16, wherein the signal generator is configured to:
provide the noise compensation signal having a first polarity responsive to the first timing control input; and
provide the noise compensation signal having a second polarity responsive to the second timing control input, in which the second polarity is opposite to the first polarity.

19. The system of claim 13, wherein the controller includes a microcontroller.

20. The system of claim 17, wherein the conductor includes a chassis of the power converter.

21. The system of claim 17, wherein the first delay circuitry includes a first delay programming input, and the second delay circuitry includes a second delay programming input.

22. The system of claim 20, wherein the power converter includes first and second switches, and the power converter has a switching terminal coupled to a respective current terminal of the first and second switches; and
wherein the system includes timing measurement circuitry having a timing input and a timing output, the timing input coupled to the switching terminal, and the timing output coupled to the first and second delay programming inputs.

* * * * *